(12) United States Patent
Omura et al.

(10) Patent No.: US 6,594,023 B1
(45) Date of Patent: Jul. 15, 2003

(54) COORDINATE INPUTTING/DETECTING APPARATUS, METHOD AND COMPUTER PROGRAM PRODUCT DESIGNED TO PRECISELY RECOGNIZE A DESIGNATING STATE OF A DESIGNATING DEVICE DESIGNATING A POSITION

(75) Inventors: Katsuyuki Omura, Hachiohji (JP); Kunikazu Tsuda, Sagamihara (JP); Mitsuru Sato, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 09/659,829

(22) Filed: Sep. 11, 2000

(30) Foreign Application Priority Data

Sep. 10, 1999 (JP) .............................. 11-257906

(51) Int. Cl.⁷ .......................... G06F 11/00; G09G 5/08; G01B 11/14
(52) U.S. Cl. .................. 356/620; 345/175; 345/157
(58) Field of Search ................... 356/620, 614, 356/621, 622, 623, 3, 4.07; 345/175, 179, 157, 173, 158; 382/295; 714/48

(56) References Cited

U.S. PATENT DOCUMENTS

| | | | |
|---|---|---|---|
| 4,644,100 A | | 2/1987 | Brenner et al. |
| 4,791,416 A | | 12/1988 | Adler |
| 5,161,113 A | | 11/1992 | Omura |
| 5,208,874 A | | 5/1993 | Omura |
| 5,218,558 A | | 6/1993 | Omura |
| 5,502,568 A | * | 3/1996 | Ogawa et al. ............. 356/620 |
| 5,579,037 A | | 11/1996 | Tahara et al. |
| 6,285,359 B1 | * | 9/2001 | Ogasawara et al. ...... 345/175 |
| 6,339,748 B1 | * | 1/2002 | Hiramatsu ............... 702/159 |
| 6,417,837 B1 | * | 7/2002 | Baba ........................ 345/157 |
| 6,421,042 B1 | * | 7/2002 | Omura et al. ............ 345/157 |
| 6,429,856 B1 | * | 8/2002 | Omura et al. ............ 345/175 |

FOREIGN PATENT DOCUMENTS

| | | |
|---|---|---|
| DE | 41 21 180 | 1/1993 |
| EP | 0 536 579 | 4/1993 |
| EP | 0 816 992 | 1/1998 |
| JP | 5-173699 | 7/1993 |
| JP | 9-319501 | 12/1997 |

OTHER PUBLICATIONS

Patent Abstracts of Japan, vol. 1999, No. 08, Jun. 30, 1999, JP 11-064026, Mar. 5, 1999.
Patent Abstracts of Japan, vol. 015, No. 198 (P-1204), May 22, 1991, JP 03 048985, Mar. 1, 1991.
IBM Technical Disclosure Bulletin, vol. 27, No. 5, pps. 2995-2998, "DEHOOKING PROCEDURE FOR HANDWRITING ON A TABLET," Oct. 1, 1984.

* cited by examiner

Primary Examiner—Hoa Q. Pham
(74) Attorney, Agent, or Firm—Oblon, Spivak, McClelland, Maier & Neustadt, P.C.

(57) ABSTRACT

A coordinate inputting/detecting apparatus for optically detecting a position of a designating device inserted into a flat or substantially flat two-dimensional coordinate inputting/detecting area of the apparatus includes a coordinate determining device to determine two-dimensional coordinates of the designating device in the coordinate inputting/detecting area. A distance determining device determines a distance of the designating device from a surface of the coordinate inputting/detecting area when the designating device is located on or in vicinity to the coordinate inputting/detecting area. A storing device stores information of the two-dimensional coordinates determined by the coordinates determining device and information of the distance determined by the distance determining device so as to be associated with each other. A coordinates change detecting/storing device detects a change of the two-dimensional coordinates information at a predetermined time interval and stores the detected change of the two-dimensional coordinates information. A distance change detecting/storing device detects a change of the distance information at a predetermined time interval and stores the detected change of the distance information. A state allocating device allocates at least one designating state among designating states of the designating device stored in advance, based upon the coordinate change information and the distance change information.

35 Claims, 27 Drawing Sheets

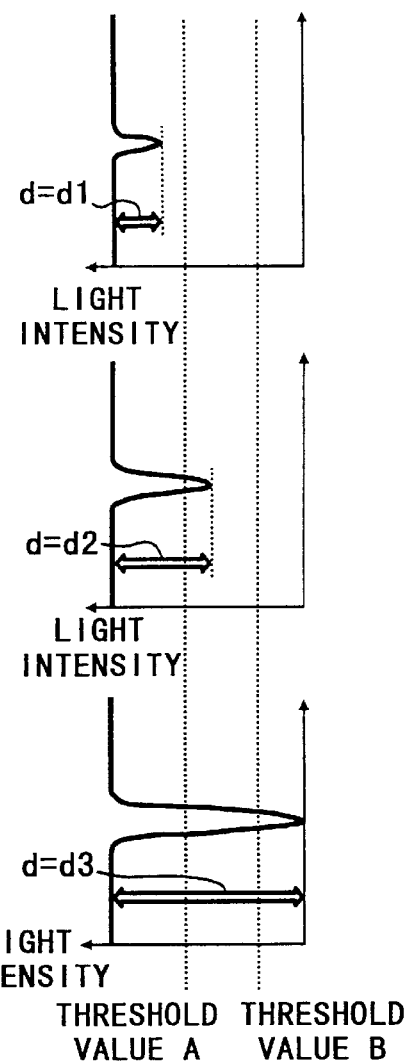
FIG. 22A
FIG. 22B
FIG. 22C
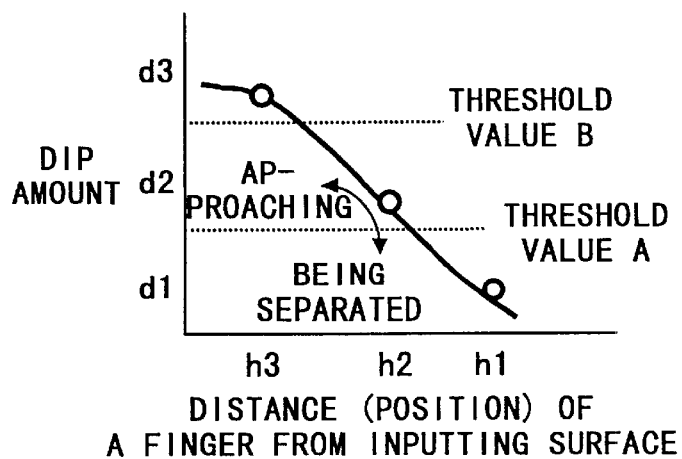
FIG. 23

FIG. 27
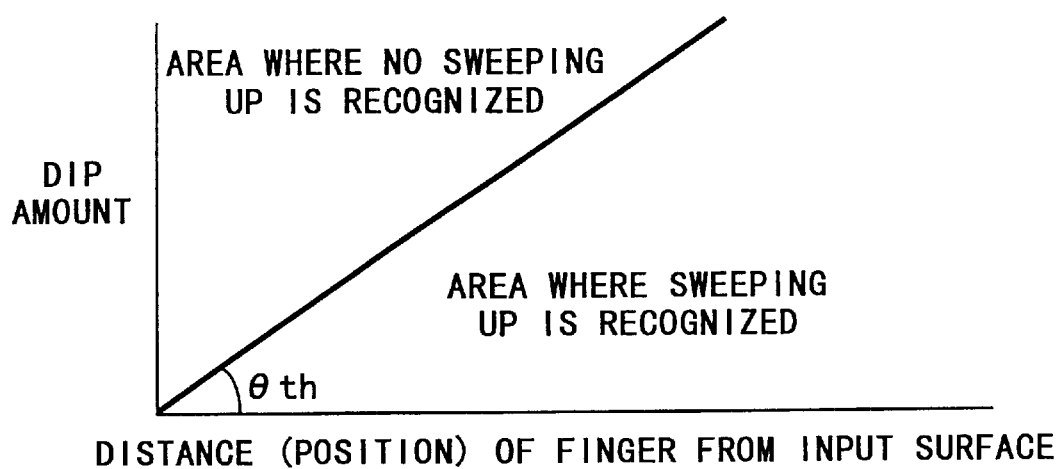
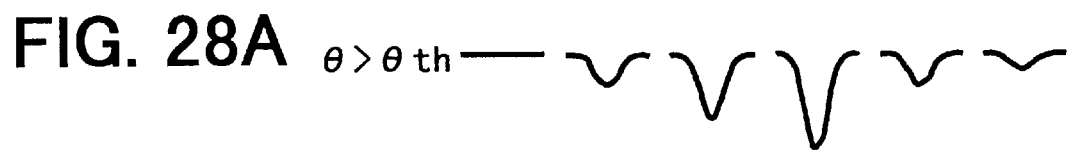
FIG. 28A  $\theta > \theta\,th$
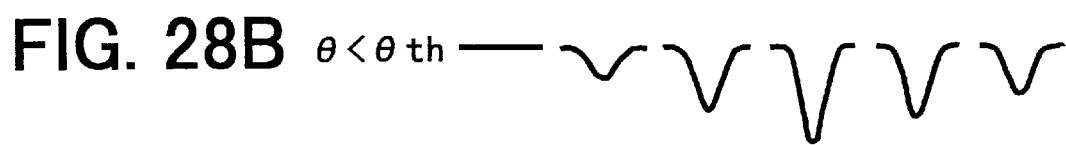
FIG. 28B  $\theta < \theta\,th$

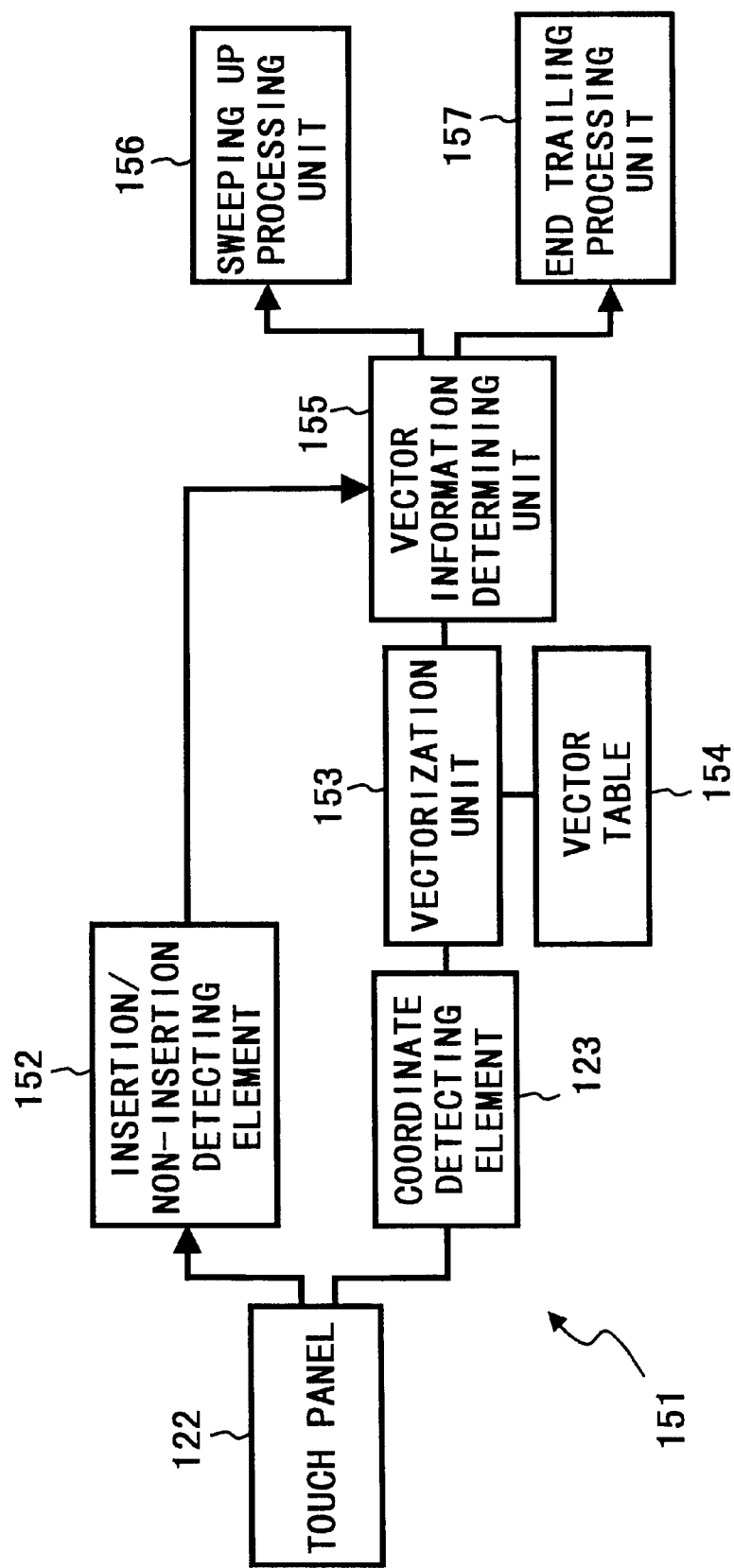

COORDINATE INPUTTING/DETECTING APPARATUS, METHOD AND COMPUTER PROGRAM PRODUCT DESIGNED TO PRECISELY RECOGNIZE A DESIGNATING STATE OF A DESIGNATING DEVICE DESIGNATING A POSITION

CROSS-REFERENCE TO RELATED DOCUMENTS

The present document claims priority on and contains subject matter related to Japanese Patent Application No. 11-257906 filed in the Japanese Patent Office on Sep. 10, 1999, and the entire contents of which are hereby incorporated herein by reference.

BACKGROUND OF THE INVENTION

1. Field of the Invention

The present invention relates to a coordinate inputting/detecting apparatus, and more particularly relates to an optical touch panel type coordinate inputting/detecting apparatus, that is integrated and used with an electronic white board or a large display apparatus, or used in conjunction with a personal computer, and that optically detects a coordinate position designated by a designating member, such as a pen, or a finger, for inputting or selecting information represented by the coordinate position designated by the designating member.

2. Discussion of the Background

A coordinate inputting/detecting apparatus is known in which, when a coordinate inputting surface of the coordinate inputting/detecting apparatus is pressed by a pen or when the pen approaches the coordinate inputting surface, an electrical change is caused by an electrostatic charge or an electromagnetic induction, and thereby the coordinate position of a point pressed or approached by the pen is detected.

Also, a touch panel type coordinate inputting/detecting apparatus using an ultrasonic wave is known in which, when a panel is touched, a surface elastic wave emitted across and over the panel is attenuated and thereby a touched position on the panel is detected, as described, for example, in Japanese Patent Laid-open Publication No. 61-239322.

However, in such a coordinate inputting/detecting apparatus that detects a coordinate position using an electrostatic force or an electromagnetic induction, an electrical switching function must be provided at a coordinate inputting surface of the coordinate inputting/detecting apparatus, thus increasing the manufacturing cost of the apparatus. Further, the pen must be connected to a main body of the apparatus, for example by a cable, which makes the operation relatively difficult.

Further, a coordinate inputting/detecting apparatus using an ultrasonic wave is generally configured assuming that a finger is used for a designating device. When a pen made of soft elastic material is used as the designating device, in writing a straight line with the pen on a panel, for example, although the attenuation of a surface elastic wave is reliably obtained when the pen is pressed against the panel, a sufficient contact of the pen with the panel is not obtained when the pen is moved, and thereby the line is broken. On the other hand, if the pen is pressed unnecessarily strongly while moving the pen for obtaining the sufficient contact with the panel, as the pen is moved, the panel receives a stress from the pen because of the elasticity of the pen. This causes a distortion in the panel, and a reverting force is exerted while the pen is moved. Therefore, in writing a curved line with the pen, the force of pressing the pen decreases such that the reverting force is greater than the pressing force. As a result, the attenuation of the surface elastic wave is not reliably obtained and thereby it is determined that the input is discontinued. Thus, the coordinate inputting/detecting apparatus using an ultrasonic wave has a problem in obtaining a high reliability of detecting an input when a pen is used as a designating device.

Further, various attempts have been made to solve the drawback of the above-described coordinate inputting/detecting apparatuses by providing optical type coordinate inputting/detecting apparatuses as described, for example, in Japanese Patent Laid-open publications No. 5-173699 and No. 9-319501. A touch panel type coordinate inputting/detecting apparatus having a relatively simple construction can be realized using such an optical type coordinate inputting/detecting apparatus.

Optical type coordinate inputting/detecting apparatus have recently become widely used in conjunction with a personal computer as an effective tool for inputting or selecting information in the personal computer. However, unlike a coordinate inputting/detecting apparatus using an ultrasonic wave, a coordinate inputting/detecting surface (i.e., a touch panel) of such optical type coordinate inputting apparatuses does not have a detecting function by itself, and an optical detecting area is provided at a position slightly apart from the coordinate inputting/detecting surface of the coordinate inputting/detecting apparatus. Therefore, a space deviation exists between the actual plane where, for example, an image (e.g., character) is drawn (written) with a finger, i.e., the coordinate inputting/detecting surface, and a plane where the coordinates of the drawn image (character) are detected, and contrary to the intention of a person drawing the image (character), a trail is caused on the drawn image (character), that is reproduced, for example, on a display. That is, in an optical type coordinate inputting/detecting apparatus, a point at which a finger separates from the touch panel is detected not in an instance when the finger actually separates from the touch panel, but when the finger separates from the touch panel by more than a certain distance. Therefore, before the finger reaches such a position separated from the touch panel by more than the certain distance and at which the finger is detected as separated from the touch panel, despite the finger having already separated from the touch panel surface and drawing of a desired character having been already completed, the finger is still detected as touching the touch panel (as being inserted in the coordinate inputting/detecting area). Thereby, an unintended line is drawn at a part of a reproduced image. Such a phenomenon of drawing an intended line is called a trailing phenomenon.

For example, as illustrated in FIG. 33, when a coordinate inputting/detecting area 200 is provided at a surface side of a touch panel 201, and if a finger 202 draws a line along the surface of the touch panel 201 and separates from the surface of the touch panel 201 upon ending the drawing at a point P, the finger 202 is continued to be detected by a detecting light, i.e. the finger 202 is detected as touching the touch panel 202, until reaching a point P' where the finger 202 leaves the coordinate inputting/detecting area 200, and at that point P' the finger 202 is first detected as separated from the touch panel 202. Accordingly, a drawing line 203 which is displayed at a surface of the touch panel 201 via a display device does not end at the point P but instead is shown as extending to the point P', and the part between the points P and P' is displayed as a trailing line 204. In practical drawing cases, for example, in drawing a Japanese Kanji character "二" ("ni") as illustrated in FIG. 34A, a line is first drawn from a point ① to a point ②, and then the finger is separated from the touch panel 202 at the point ②. Thereafter, another line is drawn from a point ③ to a point ④, and the finger is separated from the touch panel 201 at a point ④. In actual drawings, however, when the finger separates from the touch panel 201 at each ending portion 205 of the points ② and ④, the above-described trailing phenomenon occurs, such that a trailing line 204 of a whisker is generated at each ending portion 205 as illustrated in FIG. 34B, thereby deteriorating the visibility of the drawn characters. Therefore, after the drawing is completed, a troublesome operation, such as erasing the trailing 204 by manipulating an erasing tool, is necessary.

Further, some Japanese Kanji and Hiragana characters have a sweeping up portion, such as, for example, a sweeping up portion 206 of Japanese Kanji character "才" ("sun") as illustrated in FIG. 34C, and a sweeping portion, such as, for example, a sweeping portion 207 of Japanese Hiragana character "っ" ("tsu") as illustrated in FIG. 34E. Because these sweeping up and sweeping portions are requisite drawings in Japanese Kanji and Hiragana characters, it is necessary to distinguish these sweeping up and sweeping portions from a trailing line in the ending portion 205. FIGS. 34D and 34F illustrate examples of reproduced drawn Kanji character "才" ("sun") and Hiragana character "っ" ("tsu"). As illustrated, a trailing line portion 204 is generated at each of the ending portions 205 and tip ends of the sweeping up portion 206 and the sweeping portion 207.

Thus, the above-described trailing problem in the optical type coordinate inputting/detecting apparatus is caused by a fact that a deviation exists between the actual designating condition of a designating member, such a finger, and the determination or the recognition of the designating device in the coordinate inputting area of the coordinate inputting/detecting apparatus. As a result, a determination as to whether the designating device is inserted in the coordinate inputting/detecting area or recognition of the designating member in the coordinate inputting/detecting area of the coordinate inputting/detecting apparatus is not reliably made.

SUMMARY OF THE INVENTION

The present invention has been made in view of the above-discussed and other problems and addresses the above-discussed and other problems.

Preferred embodiments of the present invention provide a novel coordinate inputting/detecting apparatus and method that precisely recognize a designating state of a designating device designating a drawing position in a coordinate inputting/detecting area, such that a relatively appropriate coordinate inputting/detecting processing is realized and a trailing phenomenon in a reproduced image is reduced.

Another preferred embodiment of the present invention provides a novel coordinate inputting/detecting apparatus and method that process a coordinate inputting/detecting process while taking into consideration characteristics of Japanese Kanji and Hiragana characters appearing at sweeping up and ending portions of the characters.

According to a preferred embodiment of the present invention, a novel coordinate inputting/detecting apparatus for optically detecting a position of a designating device inserted into a flat or substantially flat two-dimensional coordinate inputting/detecting area of the apparatus includes a coordinate determining device to determine two-dimensional coordinates of the designating device in the coordinate inputting/detecting area. A distance determining device determines a distance of the designating device from a surface of the coordinate inputting/detecting area when the designating device is located on or in vicinity to the coordinate inputting/detecting area. A storing device stores information of the two-dimensional coordinates determined by the coordinates determining device and information of the distance determined by the distance determining device so as to be associated with each other. A coordinates change detecting/storing device detects a change of the two-dimensional coordinates information stored in the storing device at a predetermined time interval and stores the detected change of the two-dimensional coordinates information. A distance change detecting/storing device detects a change of the distance information stored in the storing device at a predetermined time interval and stores the detected change of the distance information. A state allocating device allocates at least one designating state among designating states of the designating device stored in advance, based upon the coordinate change information detected and stored by the coordinate change detecting/storing device and the distance change information detected and stored by the distance change detecting/storing device.

According to another preferred embodiment of the present invention, a novel coordinate inputting/detecting apparatus for optically detecting a position of a designating device inserted into a flat or substantially flat two-dimensional coordinate inputting/detecting area of the apparatus includes a coordinate determining device to determine two-dimensional coordinates of the designating device in the coordinate inputting/detecting area. A distance determining device determines a distance of the designating device from a surface of the coordinate inputting/detecting area when the designating device is located on or in vicinity to the coordinate inputting/detecting area. A storing device stores information of the two-dimensional coordinates determined by the coordinates determining device and information of the distance determined by the distance determining device so as to be associated with each other. A coordinates change detecting/storing device detects a change of the two-dimensional coordinates information stored in the storing device at a predetermined time interval and stores the detected change of the two-dimensional coordinates information, and a distance change detecting/storing device detects a change of the distance information stored in the storing device at a predetermined time interval and stores the detected change of the distance information. Further, a ratio calculating device calculates a ratio between the coordinates change detected by the coordinates change detecting/storing device and the distance change detected by the distance change detecting/storing device, and a threshold value storing device stores at least one predetermined threshold value for the ratio. A comparing device compares the ratio calculated by the ratio calculating device and the threshold value stored by the threshold storing device, and a state allocating device allocates at least one designating state among designating states of the designating device stored in advance, based upon a result of the comparison by the comparing device.

According to still another preferred embodiment of the present invention, a novel coordinate inputting/detecting apparatus for optically detecting a position of a designating device inserted into a flat or substantially flat two-dimensional coordinate inputting/detecting area of the apparatus includes a coordinate determining device to determine two-dimensional coordinates of the designating device in the coordinate inputting/detecting area and a distance determining device to determine a distance of the designating device from a surface of the coordinate inputting/detecting area when the designating device is located on or in vicinity to the coordinate inputting/detecting area. A storing device stores information of the two-dimensional coordinates determined by the coordinates determining device and information of the distance determined by the distance determining device so as to be associated with each other. A coordinates change detecting/storing device detects a change of the two-dimensional coordinates information stored in the storing device at a predetermined time interval and stores the detected change of the two-dimensional coordinates information, and a distance change detecting/storing device detects a change of the distance information stored in the storing device at a predetermined time interval and stores the detected change of the distance information. Further, a gradient calculating device calculates a gradient of the distance change detected by the distance change detecting/storing device relative to the coordinates change detected by the coordinates change detecting/storing device, and a threshold value storing device stores at least one predetermined threshold value for the gradient. A comparing device compares the gradient calculated by the gradient calculating device and the threshold value stored by the threshold storing device, and a state allocating device allocates at least one designating state among designating states of the designating device stored in advance, based upon a result of the comparison by the comparing device.

According to the present invention, in the above coordinate inputting/detecting apparatuses, the state allocating device may include a determining device to determine, according to a result of the comparison by the comparing device, that the designating device has not been inserted into the coordinate inputting/detecting area when the ratio is greater than the threshold value, and that the designating device has been inserted into the coordinate inputting/detecting area when the ratio is equal to or smaller than the threshold value.

According to another preferred embodiment of the present invention, a novel coordinate inputting/detecting apparatus for optically detecting a position of a designating device inserted into a flat or substantially flat two-dimensional coordinate inputting/detecting area of the apparatus includes a coordinates determining device to determine two-dimensional coordinates of the designating device in the coordinate inputting/detecting area at a predetermined time interval, and an insertion/non-insertion state detecting device to detect an insertion/non-insertion state of the designating device relative to the coordinate inputting/detecting area. Further, a vectorization device converts information of a direction and a length of a change between two two-dimensional coordinates sequentially detected by the coordinates determining device at the predetermined time interval into a coordinates vector value. And, a sweeping up processing device processes, if a change of a first coordinates vector value, obtained by the vectorization device when the non-insertion state of the designating device is detected at a first two-dimensional coordinates by the insertion/non-insertion state detecting device, from a second coordinates vector value, obtained by the vetorization device at a second two-dimensional coordinates immediately before the first two-dimensional coordinates, is not greater than a predetermined value, a drawing line connecting between the second two-dimensional coordinates and a third two-dimensional coordinates immediately before the second two-dimensional coordinates so as to be reduced by a predetermined length.

According to still another preferred embodiment of the present invention, a novel coordinate inputting/detecting apparatus for optically detecting a position of a designating device inserted into a flat or substantially flat two-dimensional coordinate inputting/detecting area of the apparatus includes a coordinates determining device to determine two-dimensional coordinates of the designating device in the coordinate inputting/detecting area at a predetermined time interval, and an insertion/non-insertion state detecting device to detect an insertion/non-insertion state of the designating device relative to the coordinate inputting/detecting area. Further, a vectorization device converts information of a direction and a length of a change between two two-dimensional coordinates sequentially detected by the coordinates determining device at the predetermined time interval into a coordinates vector value. And, a trailing processing device processes, if a change of a first coordinates vector value, obtained by the vectorization device when the non-insertion state of the designating device is detected at a first two-dimensional coordinates by the insertion/non-insertion state detecting device, from a second coordinates vector value, obtained by the vetorization device immediately before the first two-dimensional coordinates, is greater than a predetermined value, a drawing line connecting between the first and second coordinates so as to be made null.

According to still another preferred embodiment of the present invention, a novel coordinate inputting/detecting apparatus for optically detecting a position of a designating device inserted into a flat or substantially flat two-dimensional coordinate inputting/detecting area of the apparatus includes a coordinates determining device to determine two-dimensional coordinates of the designating device in the coordinate inputting/detecting area at a predetermined time interval, and an insertion/non-insertion state detecting device to detect an insertion/non-insertion state of the designating device relative to the coordinate inputting/detecting area. A vectorization device converts information of a direction and a length of a change between two two-dimensional coordinates sequentially detected by the coordinates determining device at the predetermined time interval into a coordinates vector value. And, a trailing processing device processes, if a change of a first coordinates vector value, obtained by the vectorization device when the non-insertion state of the designating device is detected at a first two-dimensional coordinates by the insertion/non-insertion state detecting device, from a second coordinates vector value, obtained by the vectorization device immediately before the first two-dimensional coordinates, is greater than a predetermined value, a drawing line connecting between the first and second two-dimensional coordinates so as to be made null. Further, a trailing length calculating device calculates an average length value of the drawing lines made null by the trailing processing device. A sweeping up processing device processes, if the change of the first coordinates vector value, obtained by the vectorization device when the non-insertion state of the designating device is detected at the first two-dimensional coordinates by the insertion/non-insertion state detecting device, from the second coordinates vector value, obtained by the vectorization device at the second two-dimensional coordinates immediately before the first two-dimensional coordinates, is not greater than the predetermined value, a drawing line connecting between the second two-dimensional coordinates and a third two-dimensional coordinates immediately before the second two-dimensional coordinates so as to be reduced by a length of the average length value.

According to the present invention, in the above coordinate inputting/detecting apparatuses, the coordinates determining device may include a plurality of light emitting devices to emit optical beams two-dimensionally toward the coordinate inputting/detecting area, a light returning reflective device to reflect the optical beams emitted by the plurality of light emitting devices so as to return in substantially reverse directions in the coordinate inputting/detecting area, and a plurality of light receiving devices respectively disposed in positions to receive the optical beams reflected by the light returning reflective device so as to detect light intensity distribution of the optical beams. The designating device has a light interrupting property, and the two-dimensional coordinates of the designating device in the coordinate inputting/detecting area are recognized based upon the existence of the designating device in emitted/received light optical paths formed in the coordinate inputting/detecting area via the light returning reflective device, and the distance determining device determines the distance of the designating device from the surface of the coordinate inputting/detecting area based upon light intensity of the optical beams received by the plurality of light receiving devices.

Further, according to the present invention, in the above coordinate inputting/detecting apparatuses, the coordinates determining device may include an image inputting device to optically input image information of the coordinate inputting/detecting area, and a conversion device to convert a part of the image information input by the image inputting device to information of two-dimensional coordinates of the designating device. The distance determining device determines the distance of the designating device from the surface of the coordinate inputting/detecting area based upon image density information of the image information input by the image inputting device.

Furthermore, according to the present invention, in the above coordinate inputting/detecting apparatuses, the coordinates determining device may include a plurality of light emitting devices to emit optical beams toward the coordinate inputting/detecting area, a plurality of light receiving devices arranged in the vicinity of the plurality of light emitting devices so as to correspond to the plurality of light emitting devices, respectively, and a light returning reflective device to reflect the optical beams emitted by the plurality of light emitting devices so as to return to substantially the same positions as those of the plurality of light emitting devices to be guided to respective corresponding light receiving devices. The two-dimensional coordinates of the designating device in the coordinate inputting/detecting area are recognized based upon light intensity distribution corresponding to an inserted position of the designating device in the coordinate inputting/detecting area, and the distance determining device determines the distance of the designating device from the surface of the coordinate inputting/detecting area based upon light intensity of the optical beams received by the plurality of light receiving devices.

Still furthermore, according to the present invention, in the above coordinate inputting/detecting apparatus, the coordinates determining device may include a plurality of light emitting devices to emit optical beams two-dimensionally toward the coordinate inputting/detecting area, and a plurality of light receiving devices arranged in positions facing the plurality of light emitting devices via the coordinate inputting/detecting area, respectively. The designating device has a light interrupting property, and the two-dimensional coordinates of the designating device in the coordinate inputting/detecting area are recognized based upon the existence of the designating device in emitted/received light optical paths formed in the coordinate inputting/detecting area, and the distance determining device determines the distance of the designating device from the surface of the coordinate inputting/detecting area based upon light intensity of the optical beams received by the plurality of light receiving devices.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIGS. 22A–22C are diagrams illustrating light-intensity distribution in respected states illustrated in FIGS. 21A–21C;

FIG. 23 is a diagram illustrating an example of the change of a dip amount of light intensity according to the change of the distance of a finger from the inputting surface;

FIG. 27 is a diagram illustrating another example of the change of a dip amount of light intensity according to the change of the distance of a finger from the inputting surface;

FIGS. 28A and 28B are diagrams illustrating the change of the dip amount in output waveforms;

FIG. 29 is a block diagram illustrating a coordinate inputting/detecting apparatus having a characteristic configuration of a fourth example according to the present invention;

DETAILED DESCRIPTION OF THE PREFERRED EMBODIMENTS

Figure 1:
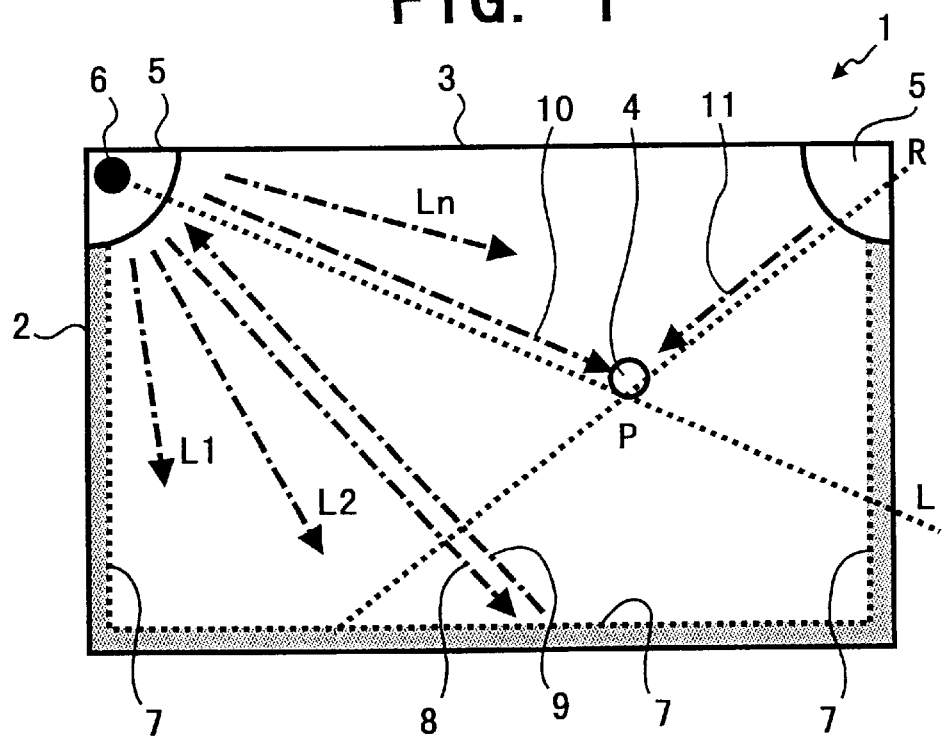
FIG. 1 is a front view illustrating a construction of a coordinate inputting/detecting apparatus employing a so-called returning light interrupting method.

Referring now to the drawings, wherein like reference numerals designate identical or corresponding parts throughout the several views, preferred embodiments of the present invention are described.

First, an exemplary construction of a coordinate inputting/detecting apparatus to which the present invention is applied is described referring to FIGS. 1–6. FIG. 1 is a front view illustrating a construction of a coordinate inputting/detecting apparatus 1 employing a so-called returning light interrupting method. A coordinate inputting/detecting area 3, which is an internal space of a coordinate inputting/detecting member 2 formed in a square shaped frame, is two-dimensionally shaped and is flat or substantially flat. The coordinate inputting/detecting area 3 may be formed, for example, by a display surface of a display apparatus that electronically displays information, e.g., a plasma display, or by a white board for writing information thereupon with a writing pen such as a marker. The coordinate inputting/detecting apparatus 1 is configured such that, when a designating device 4, that is made of an optically opaque material so as to function as a light interrupting device, for example a finger of an operating person, a pen, or a designating rod, touches on the coordinate inputting/detecting area 3, the coordinates of the designating device 4 in the coordinating inputting/detecting area 3 are detected.

A light emitting/receiving device 5 is arranged at each of the upper (or lower) corners of the coordinate inputting/detecting area 3 in FIG. 1, and as illustrated as an example, probing light fluxes L1, L2, . . . , Ln are emitted from the light emitting/receiving device 5 at the left side toward the coordinate inputting/detecting area 3. Specifically, these probing light fluxes L1–Ln progress, while forming a fan-like shape, along a plane parallel to a coordinate inputting plane of the coordinate inputting/detecting area 3 extending from a secondary light source 6 having a spot shape.

Light returning reflective members 7 are attached to circumferential portions of the coordinate inputting/detecting area 3 such that respective light returning reflecting surfaces thereof face a center of the coordinate inputting/detecting area 3, respectively.

Each light returning reflective member 7 has the property to reflect an incident light thereto in a reverse direction independent of the incident angle. For example, a beam 8 emitted from the light emitting/receiving device 5 at the left side is reflected by a light returning reflective member 7 so as to return toward the light emitting/receiving device 5, as a returning reflected light 9, while passing through the same optical path the beam 8 passed through when propagated toward the light reflective member 7 from the light emitting/receiving device 5. A light receiving device (described below) is arranged in the light emitting/receiving device 5 so as to determine if a returning light has returned to the light emitting/receiving device 5 with respect to each of the probing light fluxes L1–Ln.

For example, if the operator touches a position P by a finger (the designating device 4), a probing light flux 10 is interrupted by the finger, and thereby the light flux 10 does not reach a respective light returning reflective member 7. Accordingly, a returning light of the probing light 10 does not reach the light emitting/receiving device 5, and thereby the returning light corresponding to the probing light flux 10 is detected as not having been received by the light receiving device 5. Thus, it is detected that the designating member 4 is inserted on a path (a straight line L) of the probing light 10. Likewise, by emitting a probing light flux 11 from the light emitting/receiving device 5 provided at the upper right corner of the coordinate inputting/detecting area 3 and by detecting that a returning light corresponding to the probing light flux 11 is not received by the right side light emitting/receiving device 5, it is determined that the designating device 4 is inserted on a path (a straight line R) of the probing light flux 11. Here, if the information of the line L and the line R can be obtained, by obtaining the coordinates of the point P by calculation, the coordinates of a position in the coordinate inputting area 3 where the designating device 4 is inserted can be obtained.

Figure 2:
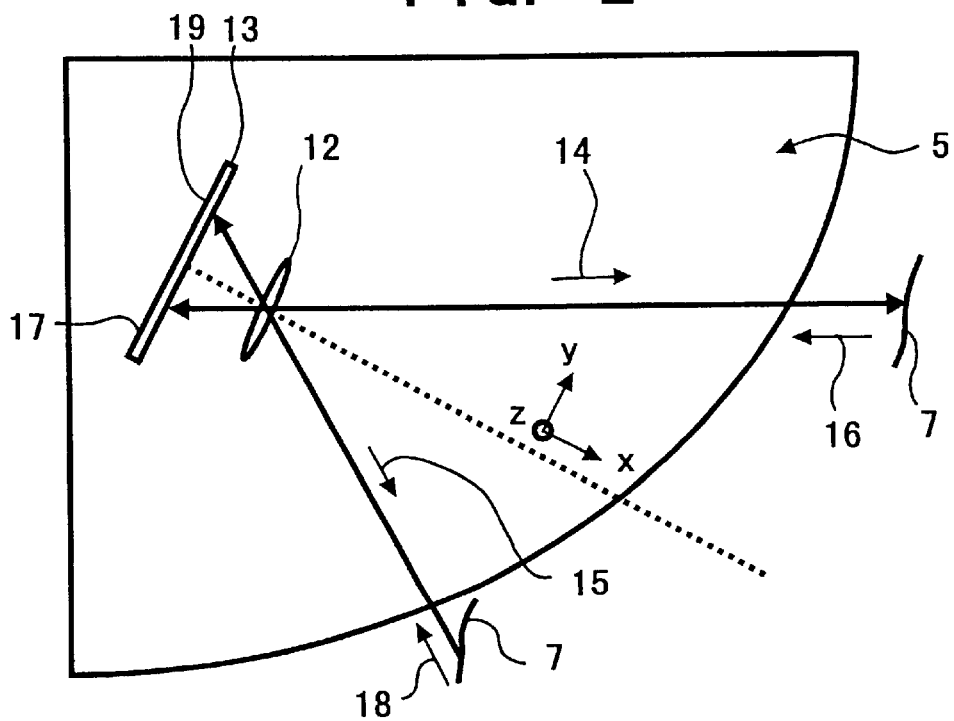
FIG. 2 is a schematic drawing illustrating an exemplary construction of an optical unit to emit and receive light, that is attached to a coordinate inputting surface of a coordinate inputting/detecting area of the coordinate inputting/detecting apparatus, which is viewed in a direction perpendicular to the coordinate inputting/detecting area of the coordinate inputting/detecting apparatus.

Next, a construction of the light emitting/receiving device 5 and a mechanism to detect which one of the probing light fluxes L1–Ln has been interrupted are described. FIG. 2 is a diagram illustrating an exemplary construction of the light emitting/receiving device 5 attached to the coordinate inputting plane of the coordinate inputting/detecting area 3, which is viewed in a direction perpendicular to the coordinate inputting/detecting area 3. For the sake of simplicity, the explanation is made for a two-dimensional plane parallel to the coordinate inputting/detecting area 3.

The light emitting/receiving device 5 includes, as illustrated in FIG. 2, the secondary light source 6, a condensing lens 12, and a light receiving element 13 including, for example, a photodiode (PD), as a light receiving device. The secondary light source 6 emits light fluxes formed in a fan-like shape in a direction opposite the light receiving element 13 when viewed from the secondary light source 6. The fan-like shaped light fluxes emitted from the secondary light source 6 are collected beams proceeding in directions indicated by arrows 14, 15 and in other directions. Also, a beam propagated in the direction indicated by the arrow 14 is reflected by a light returning reflective member 7 in a direction indicated by an arrow 16 and passes through the condensing lens 12 to reach a position 17 on the light receiving element 13. A beam propagated in the direction indicated by the arrow 15 is reflected by a light returning reflective member 7 and passes through the condensing lens 12 to reach a position 19 on the light receiving element 13. Thus, the light fluxes, which have been emitted from the secondary light source 6 and reflected by the light returning reflective members 7 so as to return through the same respective light paths as when propagating to the light returning reflective members 7, reach different positions on the light receiving element 13, respectively. Accordingly, if the designating device 4 is inserted in a certain position in the coordinate inputting/detecting area 3 and a light flux is interrupted by the designating device 4, a returning light does not reach a position on the light receiving element 13 corresponding to the interrupted light flux. Therefore, by examining the light intensity distribution on the light receiving element 13, which one of the light fluxes L1–Ln has been interrupted can be recognized.

Figure 3:
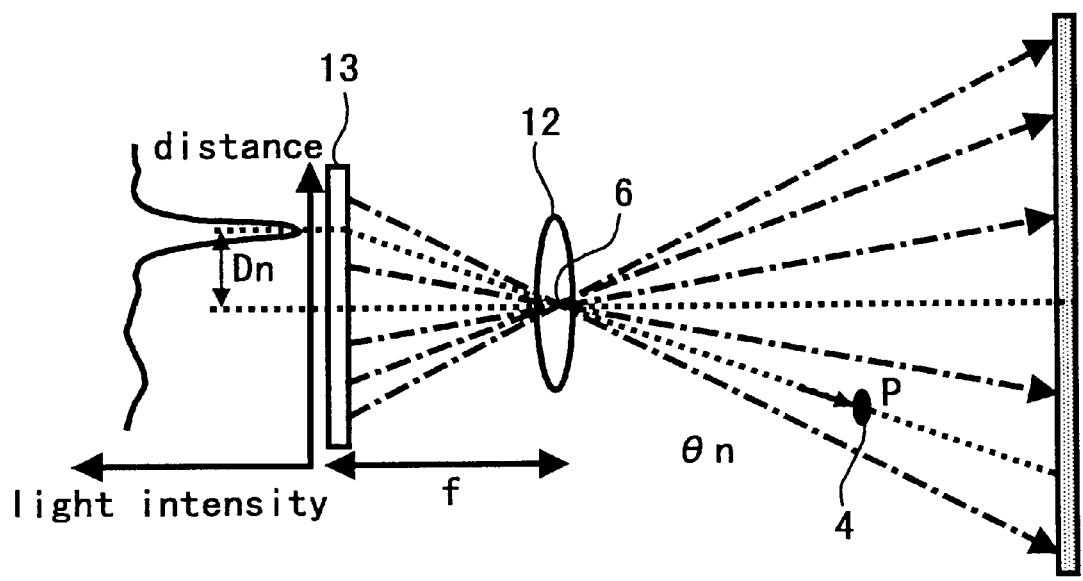
FIG. 3 is a schematic drawing for explaining an operation of detecting a designated point in the coordinate inputting/detecting area of the coordinate inputting/detecting apparatus.

The above operation is described more in detail with reference to FIG. 3. In FIG. 3, the light receiving element 13 is arranged at a focusing plane (at a position of a focusing length f) of the condensing lens 12. A light flux emitted from the light source 6 toward the right side in FIG. 3 is reflected by a respective light returning reflective member 7 so as to return to pass through the same optical path as when propagated to the respective light returning reflective member 7. Accordingly, the reflected returning light flux is again condensed at the position of the secondary light source 6. The condensing lens 12 is arranged such that the center thereof coincides with the position of the secondary light source 6. Because a reflected light returned from the light returning reflective member 7 passes through the center of the condensing lens 12, the reflected returning light proceeds toward a rear side of the condensing lens 12 (toward the light receiving element 13) passing through a symmetrical light path.

If the designating device 4 is not inserted in the coordinate inputting/detecting area 3, the light intensity distribution on the light receiving element 13 is substantially uniform. However, as illustrated in FIG. 3, if the designating device 4 having the property of interrupting light is inserted in the coordinate inputting/detecting area 3 at the position P, a light flux passing through the point P is interrupted by the designating device 4, and thereby. an area where the light intensity is weak (a blind point) is generated at a position on the light receiving element 13 a distance Dn apart from the position corresponding to the optical axis of the condensing lens 12. The distance Dn corresponds to an emerging/incident angle θn of the interrupted light flux, and the angle θn can be known by detecting the distance Dn. That is, the angle θn can be expressed as a function of the distance Dn as follows:

$$\theta n = \arctan(Dn/f) \quad (1).$$

Here, the angle θn and the distance Dn in the light emitting/receiving device 5 at the upper left corner of the coordinate inputting/detecting area 3 in FIG. 1 are respectively replaced with an angle θnL and a distance DnL.

Further, in FIG. 4, according to a conversion coefficient "g" of a geometrical relationship between the light emitting/receiving device 5 and the coordinate inputting/detecting area 3, an angle θL formed by the designating device 4 and the coordinate inputting/detecting area 3 can be expressed as a function of the distance DnL obtained by the above equation (1), as follows:

$$\theta L = g(\theta nL) \quad (2),$$

wherein θnL=arctan(DnL/f).

Likewise, with respect to the light emitting/receiving device 5 arranged at the upper right corner of the coordinate inputting/detecting area 3 in FIG. 1, replacing reference L in the above equations (1) and (2) with reference R, according to a conversion coefficient "h" of a geometrical relationship between the light emitting/receiving device 5 at the upper right corner and the coordinate inputting/detecting area 3, an angle θR formed by the designating device 4 and the coordinate inputting/detecting area 3 can be expressed as follows:

$$\theta R = h(\theta nR) \quad (3),$$

wherein θnR=arctan(DnR/f).

Figure 4:
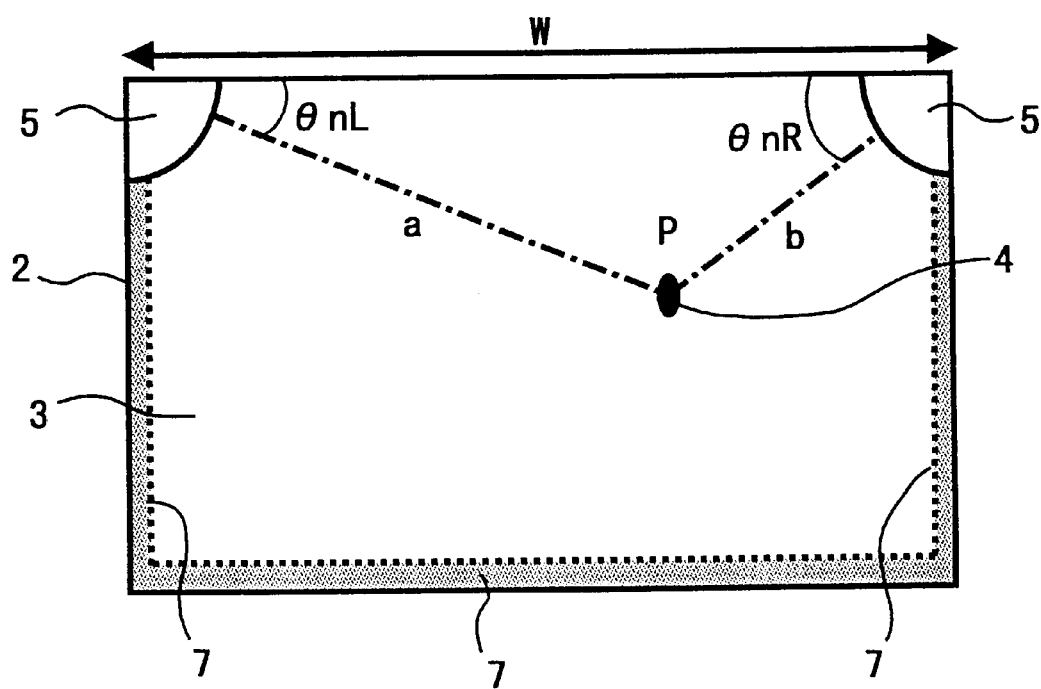
FIG. 4 is another schematic drawing for explaining the operation of detecting a designated point in the coordinate inputting/detecting area of the coordinate inputting/detecting apparatus.

When an interval between the light emitting/receiving devices 5 arranged at the upper right and left corners of the coordinate inputting/detecting area 3 is expressed by "w" and the origin of the coordinate axes is set as illustrated in FIG. 4, two-dimensional coordinates (x, y) of the point P designated by the designating device 4 are expressed as follows:

$$x = w \cdot \tan \theta nR / (\tan \theta nL + \tan \theta nR) \quad (4)$$

$$y = w \cdot \tan \theta nL \cdot \tan \theta nR / (\tan \theta nL + \tan \theta nR) \quad (5).$$

Thus, "x" and "y" are expressed as a function of DnL and DnR. That is, the two-dimensional coordinates of the point P designated by the designating device 4 can be obtained by detecting the distances DnL, DnR of the blind points on the light receiving element 13 of the light emitting/receiving devices 5 provided at the upper left and right corners of the coordinate inputting/detecting area 3 and by considering the geometrical disposition of the light emitting/receiving devices 5.

Figure 5:
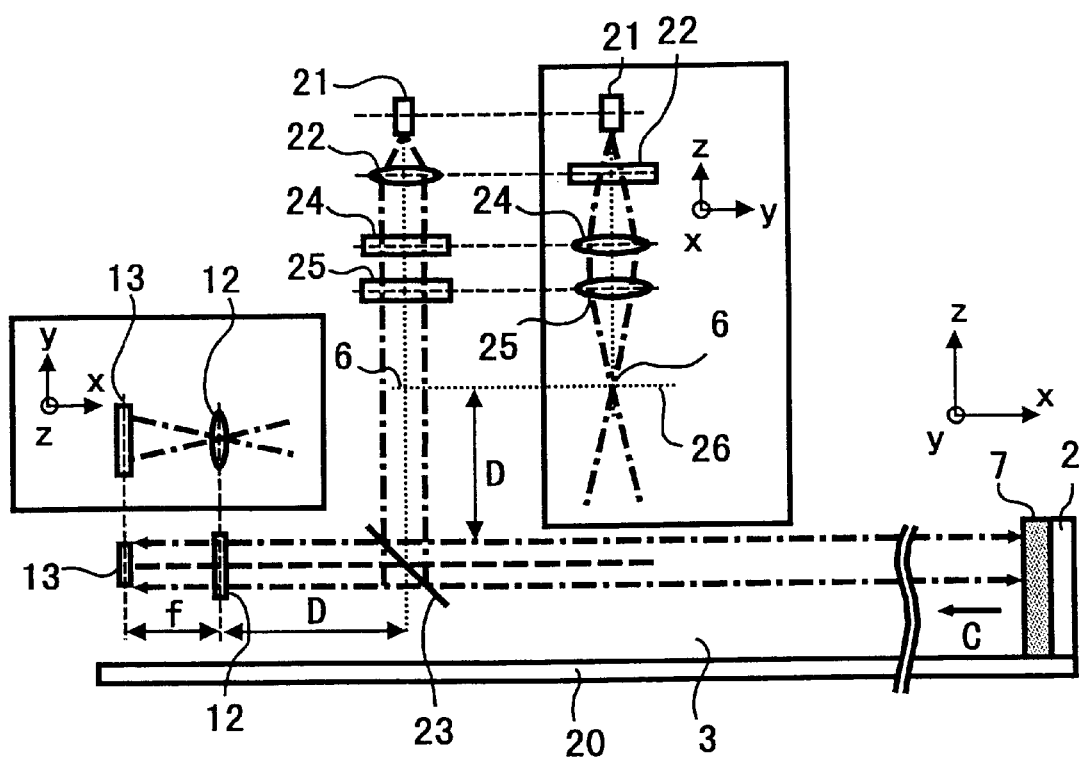
FIG. 5 is a cross-section view illustrating an example of arranging the optical unit at a display surface of a display apparatus.

Next, an example in which an optical system is disposed in the coordinate inputting/detecting area 3, for example, at a surface of a display apparatus, is described. FIG. 5 illustrates an example in which one of the light emitting/receiving devices 5 is arranged at a display surface of a display apparatus.

In FIG. 5, reference numeral 20 denotes a cross-section of the display surface viewed in a direction from a negative side to a positive side of the y axis illustrated in FIG. 2, that is, in an x-z direction. The same portions of the light emitting/receiving device 5 viewed from different directions (an x-y direction, a y-z direction) are also illustrated in FIG. 5 in the parts enclosed by two-dot-straight lines.

As a light source 21, a laser diode or a pinpoint LED, which can make an optical spot relatively small, is used. A light flux emitted by the light source 21 in a direction perpendicular to the display surface 20 is collimated only in the x direction by a cylindrical lens 22 such that the collimated light flux, after later having been reflected by a half-mirror 23, proceeds in a direction perpendicular to the display surface 20 as a parallel light flux. After passing through the cylindrical lens 22, the light flux is converged in the y direction by two cylindrical lenses 24, 25, that have a curvature distribution in a direction crossing with that of the cylindrical lens 22.

An area condensed in a linear shape is formed by the function of these cylindrical lenses 22, 24, 25 at the rear of the cylindrical lens 25, where a slit 26 which is narrow in the y direction and elongated in the x direction is inserted. That is, the secondary light source 6 having a linear shape is formed at the position of the slit 26. Light emitted from the secondary light source 6 is reflected by the half-mirror 23, and proceeds as a parallel light along the display surface 20, while not extending in a direction perpendicular to the display surface 20, but extending in a fan-like shape about the secondary light source 6 in a direction parallel to the display surface 20. The light flux is reflected by the light returning reflective member 7 provided at circumferential edges of the display apparatus, and the reflected light returns to the half-mirror 23 (in a direction indicated by an arrow C) passing through the same light path the light flux has passed when propagated toward the light returning reflective member 7. The light flux which has passed through the half-mirror 23 propagated in parallel to the display surface 20, and passes through a cylindrical lens 12 to be incident on the light receiving element 13.

The secondary light source 6 and the cylindrical lens 12 are both arranged at a position a distance D apart from the half-mirror 23 and are in a conjugate relationship. Accordingly, the secondary light source 6 having a linear shape corresponds to the light source 6 having a spot shape in FIG. 3 and the cylindrical lens 12 corresponds to the lens 12 in FIG. 3.

Figure 6:
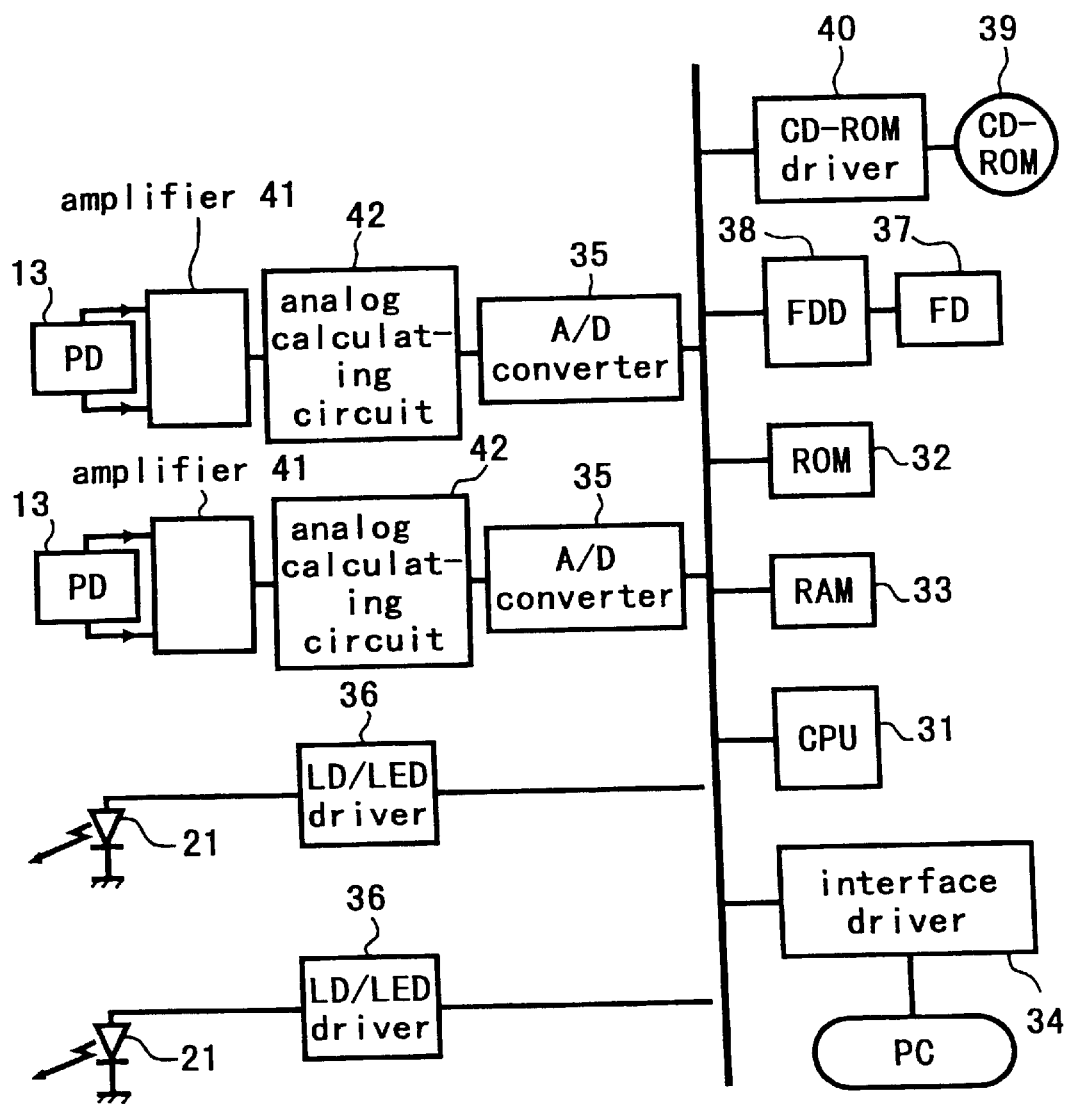
FIG. 6 is a block diagram illustrating a construction of a control circuit of a light source and a light receiving element of the optical unit.

FIG. 6 is a block diagram illustrating a construction of a control circuit for the light source 21 and the light receiving element 13. In FIG. 6, the light receiving element 13 is labeled as PD 13. The control circuit controls the emission of the light source 21 and calculates the output from the light receiving element 13. As illustrated in FIG. 6, the control circuit includes a CPU 31, a ROM 32 for storing programs and data, a RAM 33, an interface driver 34, an A/D converter 35, and an LD/LED driver 36, each connected to a bus. The CPU 31, the ROM 32 and the RAM 33 constitute a microcomputer, and a FD driver (FDD) 38 attaching a FD 37, and a CD-ROM driver 40 attaching a CD-ROM 39 are connected thereto.

An amplifier 41 and an analog calculating circuit 42 are connected to an output terminal of the light receiving element 13 as circuits for calculating the output of the light receiving element 13. The output from the light receiving element 13 (a light intensity distribution signal) is input to the amplifier 41 so as to be amplified. The amplified signal is processed by the analog calculating circuit 42, converted to a digital signal by the A/D converter 35, and is then transferred to the CPU 31. Thereafter, the CPU 31 calculates a light receiving angle at the light receiving element 13 and two-dimensional coordinates of the designating device 4.

The control circuit may be housed in a housing of one of the light emitting/receiving devices 5, or may be housed in a separate housing and accommodated in a part of the coordinate inputting/detecting area 3. Further, an output terminal may be preferably provided to the control circuit for outputting calculated coordinate data to a personal computer via the interface driver 34.

Figure 7:
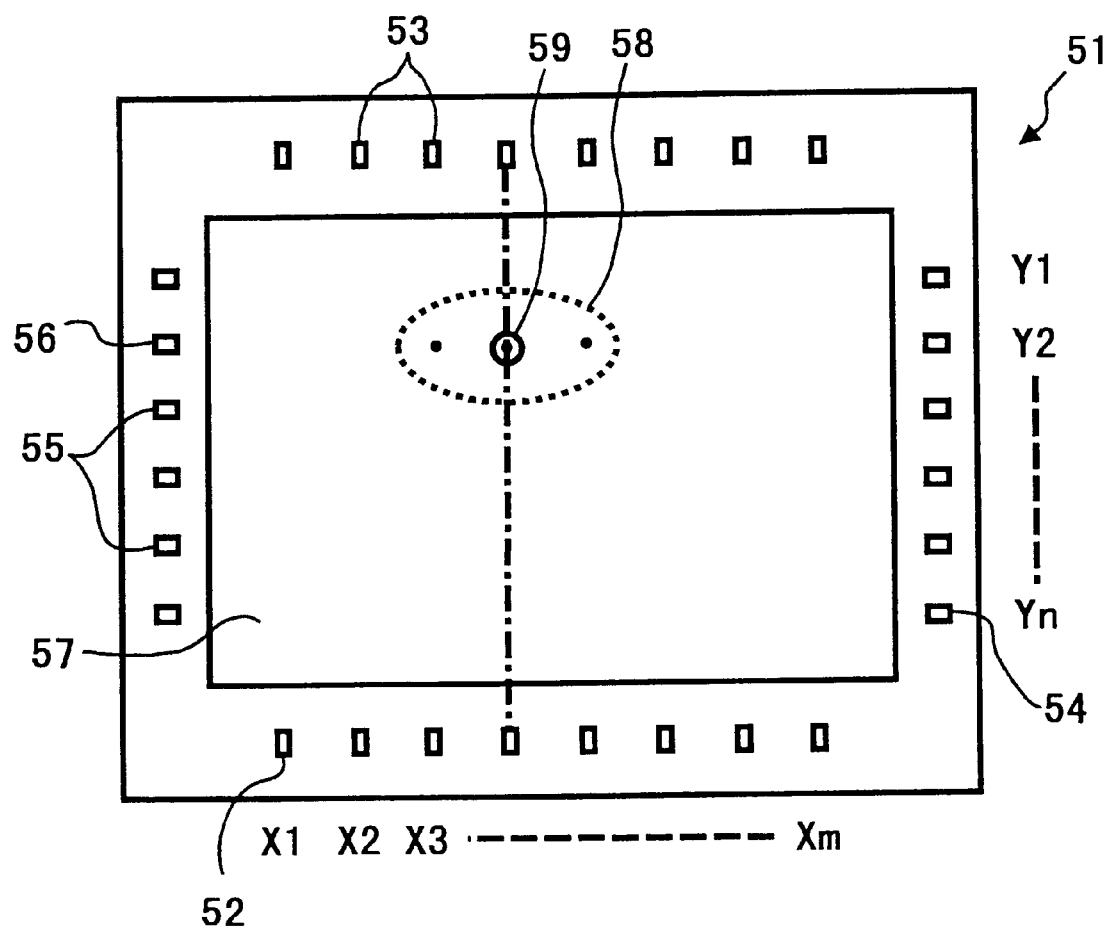
FIG. 7 is a schematic drawing illustrating an example of a coordinate inputting/detecting apparatus using an LED array system.

FIG. 7 illustrates an example of a coordinate inputting/detecting apparatus 51 using an LED array system, which is described, for example, in Japanese Patent Laid-open publication No. 5-173699.

The coordinate inputting/detecting apparatus 51 includes, as illustrated in FIG. 7, an Xm number of light emitting devices 52, for example light emitting diodes (LEDs), which are arranged in a horizontal direction, an Xm number of light receiving devices 53, for example phototransistors, which are arranged so as to face the LEDs 52, respectively, a Yn number of LEDs 54 which are arranged in a vertical direction, and a Yn number of phototransistors 55 which are arranged so as to face the LEDs 54, respectively, such that a coordinate inputting/detecting area 57 is formed as an internal space of a coordinate inputting/detecting member 56 formed in a rectangular shaped frame.

If a designating device having a light interrupting property, for example, a finger 58, is inserted into the coordinate inputting/detecting area 57 so as to touch a surface of the coordinate inputting/detecting area 57, a light path between the light emitting device 52 and the light receiving device 53 passing through the position where the finger 58 is located is interrupted by the finger 58, and thereby each receiving light quantity of the phototransistors 53 and 55, which are located in the interrupted light path, decreases. Therefore, by averaging the positions of the phototransistors 53 and 55, the two-dimensional coordinates 59 of a portion in the coordinate inputting/detecting area 57 touched by the finger 58 are obtained.

Figure 8:
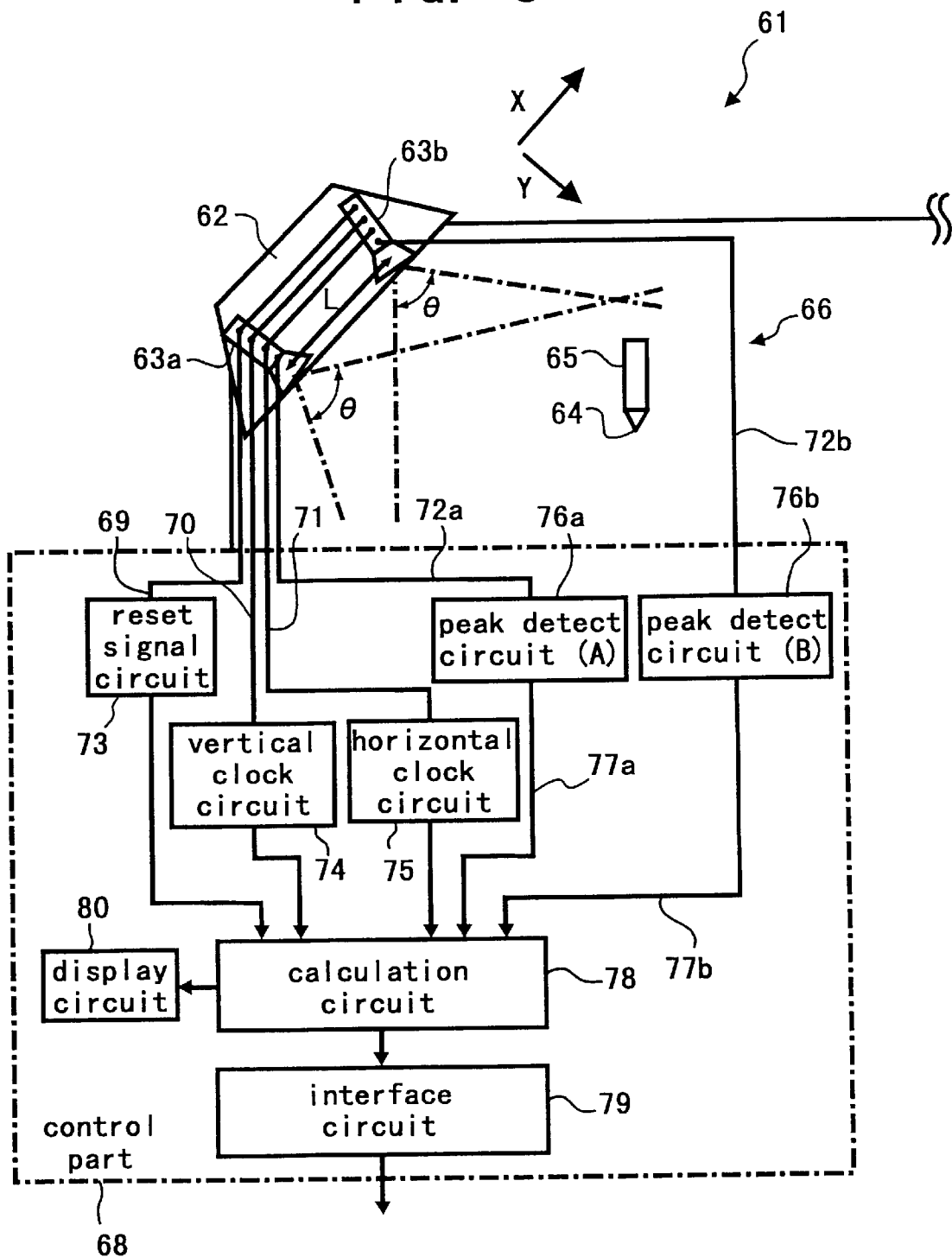
FIG. 8 is a block diagram illustrating a construction of a coordinate inputting/detecting apparatus using a camera imaging system.

FIG. 8 is a block diagram of a coordinate inputting/detecting apparatus 61 using a camera imaging system. Reference numeral 62 denotes an infrared rays position detecting part, and reference numerals 63*a* and 63*b* respectively denote infrared rays CCD cameras as optical units serving as image inputting devices, which are arranged in a horizontal direction so as to be spaced apart from each other a distance L in the infrared rays position detecting part 62. Reference numeral 64 denotes an infrared rays LED, and reference numeral 65 denotes a coordinate inputting unit serving as a designating device. The coordinate inputting unit 65 is formed in a pen-like shape and has the infrared rays LED 64 at a tip end thereof so as to irradiate infrared rays from the infrared rays LED 64 upward. Thus, an imaging range of the infrared rays position detecting part 62 is set as a two-dimensional coordinate inputting/detecting area 66 and is formed in a plane by the coordinate inputting/detecting member (not shown).

Reference numeral 68 denotes a control part, reference numeral 69 denotes a reset signal, which is generated at the control part 68 and is input to the infrared rays CCD cameras 63*a*, 63*b* of the infrared rays position detecting part 62, reference numeral 70 denotes a vertical clock signal for scanning in a vertical direction, which is generated at the control part 68 and which is input to the infrared rays CCD cameras 63a, 63b, and numeral 71 denotes a horizontal clock signal for scanning in a horizontal direction, which is generated at the control part 68 and which is input to the infrared rays CCD cameras 63a, 63b. The infrared rays cameras 63a, 63b start scanning in an X-Y direction in response to inputting of the reset signal 69, the vertical clock signal 70, and the horizontal clock signal 71.

Reference numerals 72a, 72b respectively denote image signals, which are output from the infrared rays CCD cameras 63a, 63b. Reference numeral 73 denotes a reset signal circuit to generate the reset signal 69, reference numeral 74 denotes a vertical clock circuit to generate the vertical clock signal 70, and reference numeral 75 denotes a horizontal clock circuit to generate the horizontal clock signal 71. Reference numerals 76a, 76b denote peak detect circuits (A), (B) which respectively detect the peaks of waves based upon the image signals 72a, 72b and generate peak signals in correspondence to a cycle of the horizontal clock signal 71. Reference numerals 77a, 77b respectively denote peak detection signals obtained from the peak detection circuits 76a, 76b.

Reference numeral 78 denotes a calculation circuit to calculate the coordinates of a position. Reference numeral 79 denotes an interface circuit that transfers the coordinates calculated by the calculation circuit 78 to a computer (not shown). Reference numeral 80 denotes a display circuit to display the position according to the coordinates calculated by the calculation circuit 78 in a display apparatus used with the coordinate inputting/detecting apparatus 61. Further, an audio circuit (not shown) that generates, for example an alerting sound, when the coordinate inputting part 65 is positioned at a position outside the imaging range (the coordinate inputting/detecting area 66) of the infrared rays position detect part 62, may be arranged, so that the operability is enhanced. Furthermore, a lens magnification adjusting circuit or a focal length adjusting circuit may be provided at each of the infrared rays CCD cameras 63a, 63b, so that the inputting resolution and the detection range can be set according to the size of an original, the required precision level of inputting, or the space allowed for operating the apparatus 61. Thereby, the operability of the apparatus 61 can be further enhanced.

In the above coordinate inputting/detecting apparatus 61, the control part 68 is separated from the infrared rays position detect part 62; however, by making each of the above-described circuits small, the control part 68 and the infrared rays detect part 62 may be integrated.

Figure 9:
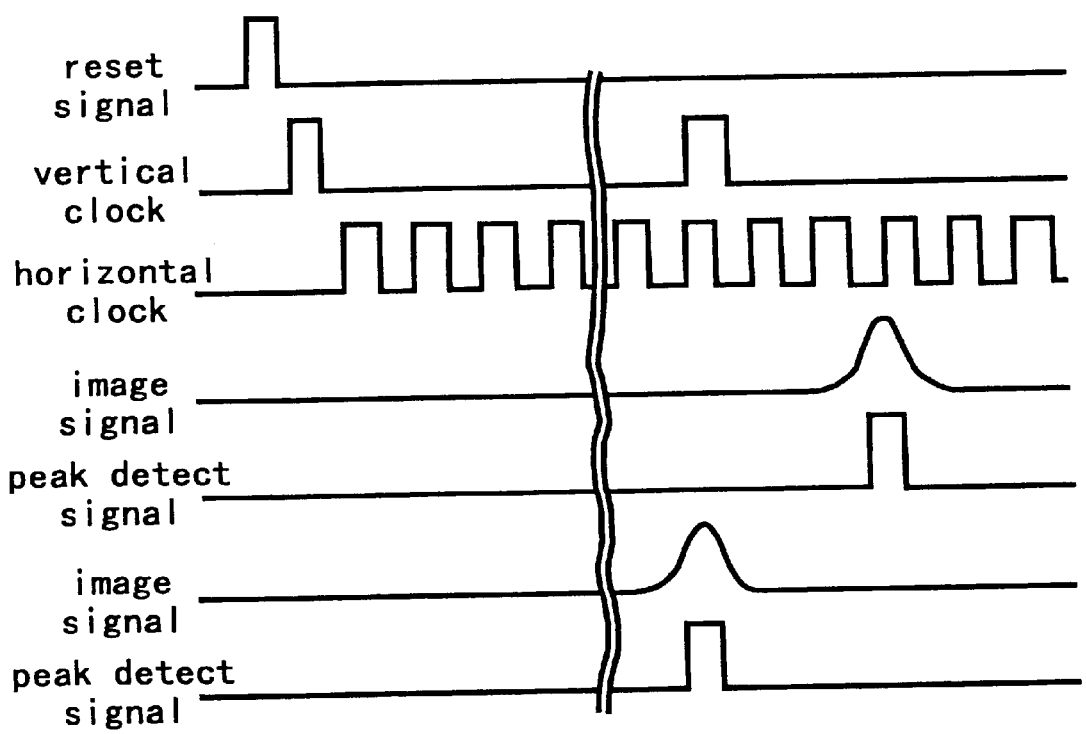
FIG. 9 is a timing chart illustrating signal waveforms of the coordinate inputting/detecting apparatus using a camera imaging system.

Now, an operation of the coordinate inputting/detecting apparatus 61 as described above is described referring to FIG. 9, which is a timing chart illustrating signal waveforms of the coordinate inputting/detecting apparatus 61.

First, the reset signal 69, the vertical clock signal 70, and the horizontal clock signal 71 are simultaneously input to the infrared rays CCD cameras 63a, 63b, and thereby the infrared rays position detect part 62 inputs the image signals 72a, 72b from the infrared rays CCD cameras 63a, 63b into the control part 68.

If the infrared rays CCD cameras 63a, 63b photograph the pen-like shaped coordinate inputting part 65 at a normal exposure, the whole part of the pen-like shaped coordinate inputting part 65 is imaged. However, if the infrared rays CCD cameras 63a, 63b photograph the pen-like shaped coordinate inputting part 65 at an underexposure, only a light emitting part of the infrared rays LED 64 is imaged, and the other parts of the coordinate inputting part 65 are not imaged and are black.

Accordingly, strong peaks appear in the image signals 72a, 72b of the infrared rays CCD cameras 63a, 63b at the positions corresponding to the position of the infrared rays LED 64, respectively. The strong peaks are respectively detected by the peak detect circuits 76a, 76b and resulting peak detection signals 77a, 77b are sent to the calculating circuit 78. At the calculating circuit 78, according to a conversion table (not shown) stored in advance in a ROM (not shown) of the control part 68, the angles of the position of the infrared rays LED 64, corresponding to which the peaks have appeared in the image signals 72a, 72b of the infrared rays CCD cameras 63a, 63b, relative to respective origin points of the infrared rays CCD cameras 63a, 63b, can be determined. Therefore, based upon the above angle information of the infrared rays LED 64 relative to the origin points of the infrared rays CCD cameras 63a, 63b and a distance L between the two infrared rays CCD cameras 63a, 63b, the two-dimensional coordinates position of the coordinate inputting part 65 can be calculated. The data of the two-dimensional coordinates thus obtained is then sent, for example, to the computer via the interface circuit 79, so that the position according to the calculated coordinates is displayed in the display apparatus.

Figure 10A:
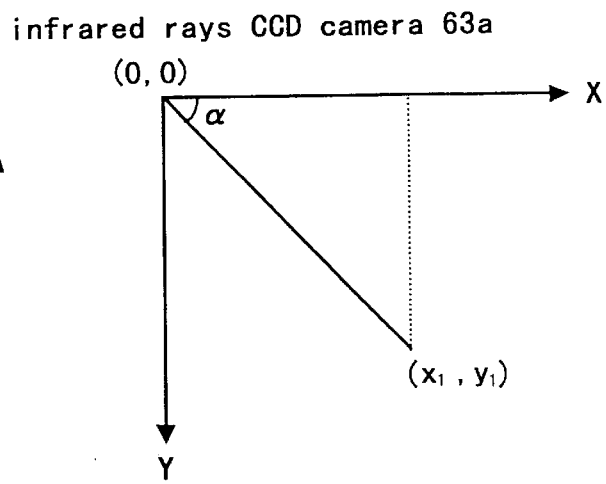
FIGS. 10A–10C are diagrams for explaining a method of calculating a two-dimensional coordinates position in the coordinate inputting/detecting apparatus.
Figure 10B:
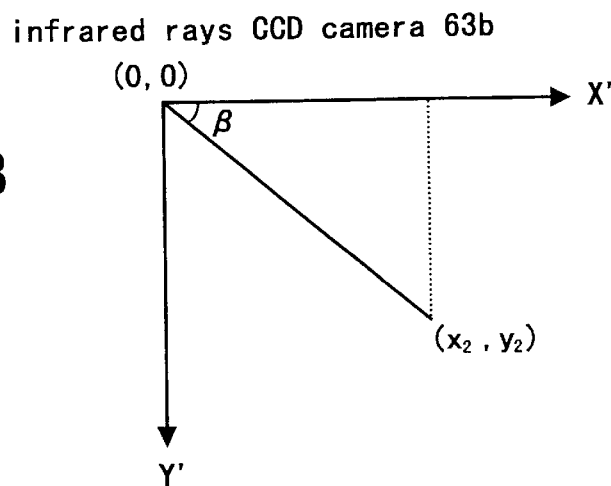
Figure 10C:
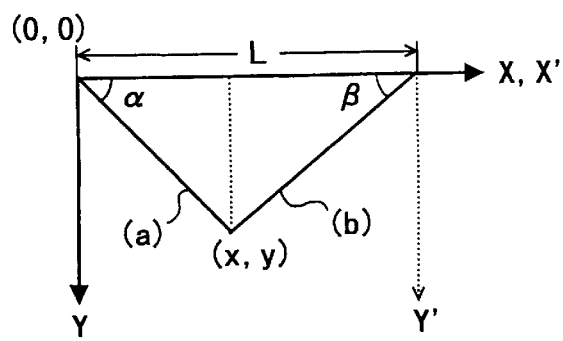

Next, a method of calculating two-dimensional coordinates in the above coordinate inputting/detecting apparatus 61 is described with reference to FIGS. 10A–10C. The peak detection signals 77a, 77b indicating the position of the coordinate inputting part 65 having the infrared rays LED 64 are respectively obtained from the image signals 72a, 72b of the two infrared rays CCD cameras 63a, 63b, and based upon the position of the vertical clock signal 70 from the reset signal 69 and the position of the horizontal clock signal 71, respective two-dimensional coordinates (x1, y1) and (x2, y2) of the coordinate inputting part 65 with respect to the infrared rays CCD cameras 63a and 63b are obtained.

The origin points of the coordinate axes are appropriately determined for the infrared rays CCD cameras 63a, 63b, respectively. For example, in this embodiment, the origin points are set at the lower left corners of the photographing areas of the infrared rays CCD cameras 63a, 63b, respectively. Accordingly, angles α, β of the infrared rays LED 64 relative to the origin points at the infrared rays CCD cameras 63a, 63b are obtained by the following formulas (6):

$$\alpha = \tan^{-1}(y1/x1)$$

$$\beta = \tan^{-1}(y2/x2) \qquad (6).$$

From these formulas, the angles α, β of the infrared rays LED 64 relative to the infrared rays CCD cameras 63a, 63b are obtained. Here, when the position of one of the infrared rays CCD cameras 63a, 63b is set to be the origin point and a distance between the two infrared rays CCD cameras 63a, 63b is represented by L, as illustrated in FIG. 10C, straight lines (a) and (b) are expressed by the following formulas (7):

$$(a) y = (\tan \alpha) \cdot x$$

$$(b) y = \{\tan(\Pi - \beta) \cdot (x - L) \qquad (7).$$

The coordinates of the coordinate inputting part 65 are obtained by solving the above simultaneous equations of first degree. For increasing the operating speed of the calculating circuit 78, a conversion table for obtaining the coordinates based upon the angles α, β can be provided, and thereby the coordinates are immediately obtained and smooth inputting of figures and characters is realized.

Thus, in the coordinate inputting/detecting apparatus 61 using a camera imaging system including an image inputting device such as an electronic camera, the two-dimensional coordinates of an inputting figure can be precisely detected without a need of placing a touch panel, for example, on an operating table, and using a space over the operating table. Therefore, the operating table can be used in a more effective manner. Further, even when the original is a bundled one, an operation of designating and inputting a position of the figure can be performed on the bundled original placed on the operating table. Furthermore, when the original includes a figure, for example, the photographing range can be variably set and the resolution can be also set according to the size of the original by the function of the lens magnification adjusting circuit, and thereby the operability and the easiness of use are enhanced.

Figure 11:
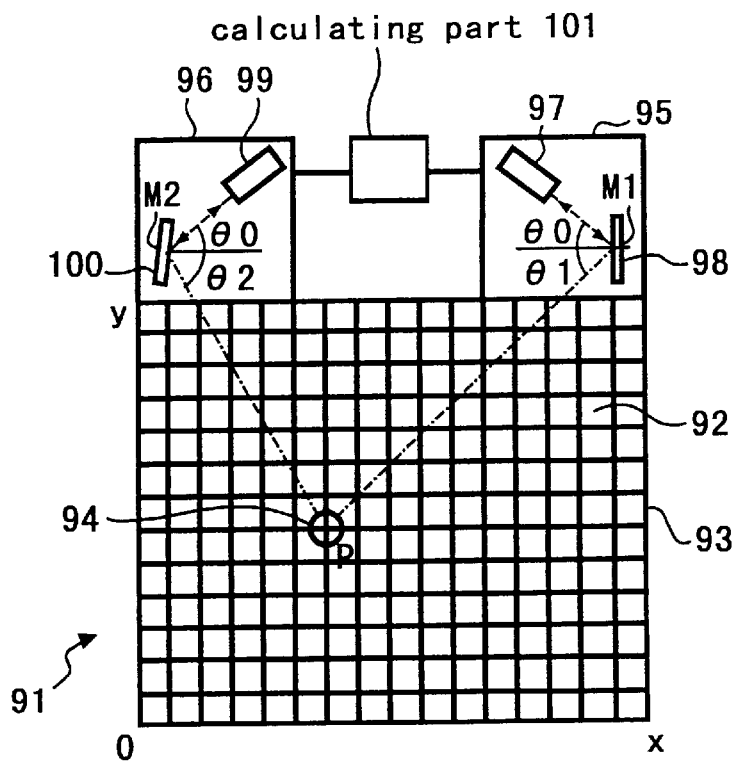
FIG. 11 illustrates a coordinate inputting/detecting apparatus using a rotation scanning system including a pen having a reflective plate.

FIG. 11 illustrates a coordinate inputting/detecting apparatus 91 using a rotation scanning system including a pen having a reflective plate. As illustrated in FIG. 11, the coordinate inputting/detecting apparatus 91 includes a flat member 93 that defines a two-dimensional coordinate inputting/detecting area 92. A cursor 94 functioning as a designating device is movably arranged on the coordinate inputting/detecting area 92. The cursor 94 has a function to reflect a scanning light, which is parallel to a surface of the coordinate inputting/detecting area 92, so as to be returned to an emerged point. By adjusting a center point P of the cursor 94 to a position desired to be input, the two-dimensional coordinates of the position are designated.

A pair of optical units 95, 96 are arranged above the coordinate inputting/detecting area 92 so as to be spaced apart from each other. A fixed light source 97 as a light emitting device including, for example, a laser emitting diode is accommodated within the optical unit 95 at the right side. Further, a reflective mirror 98 that rotates at a constant speed around a predetermined rotation axis is arranged so as to sequentially reflect the light fluxes emitted by the light source 97 so that a first rotating scanning light flux is generated over the surface of the coordinate inputting/detecting area 92. Also, the coordinate inputting/detecting apparatus 91 includes a light receiving element (not shown) for receiving a returning light reflected by the cursor 94 so as to be returned. By being configured as described above, the optical unit 95 measures a declination angle $\theta_1$ of a returning light.

The optical unit 96 at the left side has a similar configuration, and the light fluxes emitted by a fixed light source 99 are sequentially reflected by a reflective mirror 100 rotating around a rotation axis M2, so that a second scanning light flux crossing the first scanning light flux is generated. Similarly, the optical unit 96 measures a declination angle $\theta_2$ of a returning light reflected by the cursor 94.

A calculating part 101 including a computer is connected to the pair of optical units 95, 96, and the two-dimensional coordinates (x, y) of the inputting point P are calculated using a predetermined two-dimensional coordinates calculation formulas (8), described below, based upon the measured values of a pair of the declination angles $\theta_1$, $\theta_2$. Here, "w" represents a distance between the rotational centers of the rotation axes M1 and M2.

$$X = w \cdot \tan \theta_1 / (\tan \theta_2 + \tan \theta_1)$$

$$Y = w \cdot \tan \theta_2 \tan \theta_1 / (\tan \theta_2 + \tan \theta_1) \quad (8).$$

Figure 12:
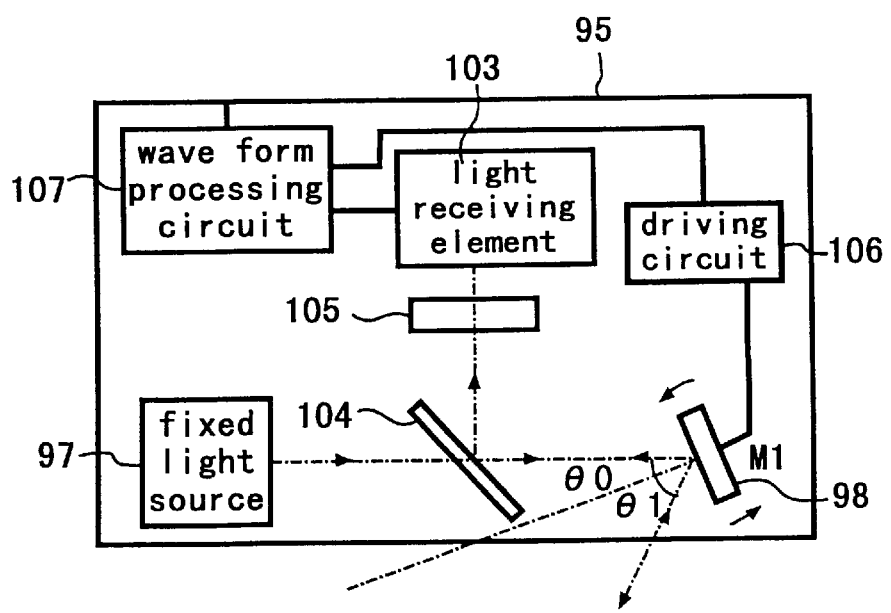
FIG. 12 illustrates a configuration of an optical unit used in the coordinate inputting/detecting apparatus.

FIG. 12 illustrates a configuration of the optical unit 95 at the right side. The optical unit 96 at the left side has a similar configuration. The optical unit 95 includes a fixed light source 97, a reflective mirror 98 that rotates at a constant equiangular speed around the rotation axis M1, and a light receiving element 103 for receiving a returning light reflected by the cursor 94 and for generating a detection signal. A light flux emitted by the fixed light source 97 passes through a half-mirror 104 and progresses toward a vicinity of the rotation axis M1 of the reflective mirror 98. The light flux is scanned at a constant equiangular speed, and when passing a central axis of the cursor 94, the light flux is reflected so as to return to the reflective mirror 98. The light flux is reflected by the reflective mirror 98 again, and after passing through a filter 105 via the half-mirror 104, the light flux is received by a light receiving element 103 including, for example, a photodiode. The light receiving element 103 outputs a detection signal in synchronism with a light receiving timing.

The reflective mirror 98 is rotated at a constant equiangular velocity by a driving circuit 106. The driving circuit 106 outputs a timing pulse for each rotation cycle of the reflective mirror 98. The timing pulse output by the driving circuit 106 and the detection pulse output by the light receiving element 103 are input into a waveform processing circuit 107, and, after having been processed by the waveform processing circuit 107, are output from an output terminal of the waveform processing circuit 107. An output signal from the waveform processing circuit 107 is output on the basis of the timing pulse and is adjusted to a time interval between the times when detection pulses are generated. Therefore, because the reflective mirror 98 rotates at a constant equiangular velocity, the output signal indicates an angle $\theta_0 + \theta_1$ including a declination angle of a returning light flux.

Figure 13:
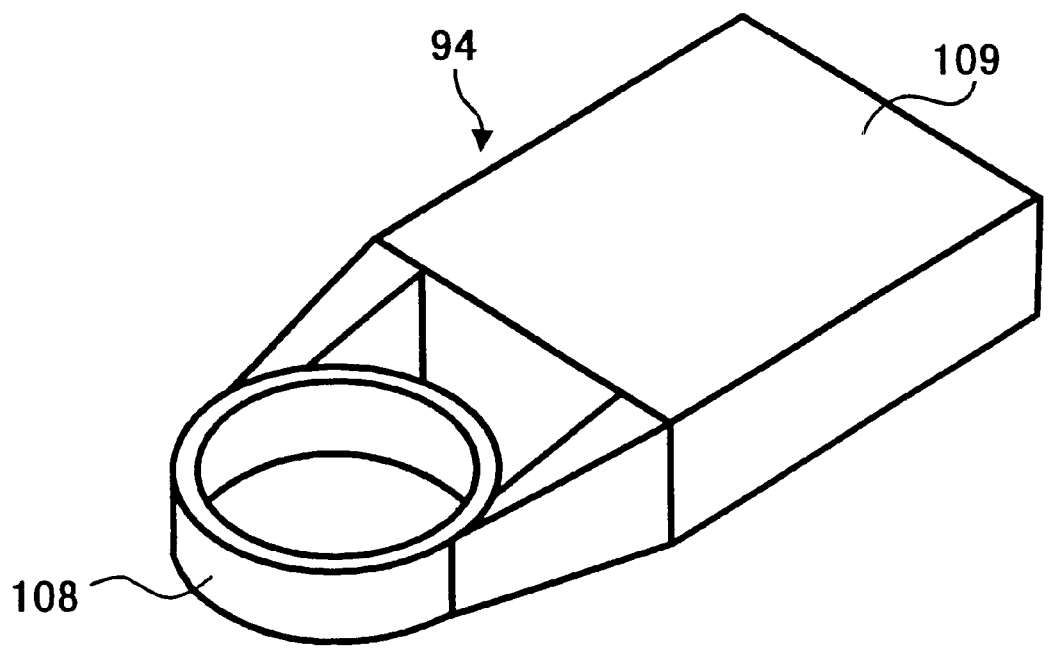
FIG. 13 is a perspective view illustrating an example of a cursor for inputting a coordinate used in the coordinate inputting/detecting apparatus.

FIG. 13 is a perspective view illustrating an example of the cursor 94 for inputting coordinates. The cursor 94 includes a light reflective member 108 having a central axis and formed in a cylinder shape, and a support member 109. An aiming member (not shown) having a hair cross mark, whose crossing point coincides with the axis of the cylinder shaped light reflective member 108, is attached to the inside of the light reflective member 108. If the cursor 94 is placed while a bottom surface of the support member 109 is contacted with a given surface of the coordinate inputting/detecting surface 92, the central axis of the cylinder shaped light reflective member. 108 is vertically placed relative to a coordinate inputting plane (the coordinate inputting/detecting surface 92). In this state, a point, which is desired to be input, is designated while holding the support member 109 and using the aiming member. Because a scanning light flux, that is in parallel to a coordinate plane and that propagates toward the central axis of the reflective member 108, is incident on a reflective surface of the reflective member 108 in a vertical direction relative to the reflective surface of the reflective member 108, the scanning light is reflected so as to return in a reverse direction through a same light path, through which the scanning light has propagated to be incident on the reflective surface of the reflective member 108, and thereby a returning light returns toward the fixed light source 97. The cursor 94 may be used for any coordinate plane as long as the coordinate plane is within a range that the scanning light flux reaches.

Figure 14:
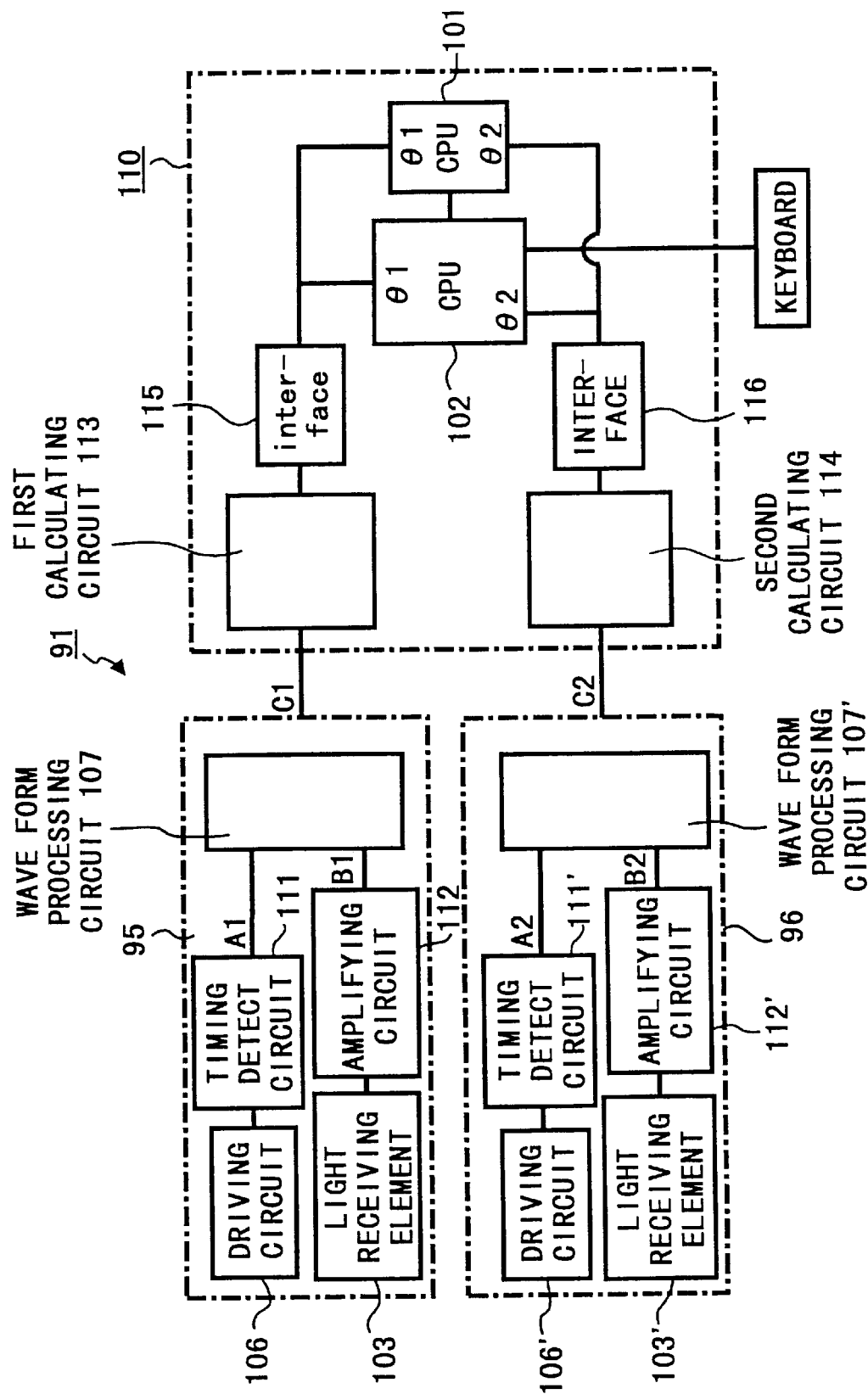
FIG. 14 is a block diagram illustrating an example of a construction of electrical circuits of the coordinate inputting/detecting apparatus.

FIG. 14 is a block diagram illustrating an example of a construction of the electrical circuits of the coordinate inputting/detecting apparatus 91. The coordinate inputting/detecting apparatus 91 includes the pair of the optical units 95, 96 as described above, and a computer 110 including the calculating part 101. The optical units 95, 96 and the computer 110 are electrically connected with each other by cables. The optical unit 95 includes a driving circuit 106 for rotating the reflective mirror 98 at a constant equiangular velocity and a timing detect circuit 111 connected with the driving circuit 106. The timing detect circuit 111 outputs a timing pulse A1, each time when the reflective mirror 98 rotates in a predetermined cycle T at a predetermined timing, for example, at a timing that a normal line for the reflective mirror 98 is in parallel to a light flux from the light source 97 (see FIG. 16). The light receiving element 103 is connected with an amplifying circuit 112, and a detection signal is output, after having been amplified, as a detection pulse B1. The wave form processing circuit 107 is connected with the timing detect circuit 111 and the amplifying circuit 112, so as to process the wave forms of the received timing pulse A1 and detection pulse B1 and to output an output pulse C1. The output pulse C1 is generated in synchronism with receiving of a returning light reflected by the cursor 94, and therefore relates to a combined angle of a declination angle of the returning light and an attachment angle of the optical unit 95, i.e., $\theta_0+\theta_1$. The optical unit 96 has a similar electrical configuration, and therefore the description thereof is omitted.

The computer 110 has a first calculating circuit 113 which times a pulse interval of the output pulse C1 from the right side optical unit 95 so as to obtain angle data $\theta_1$. The computer 110 also has a second calculating circuit 114 which times a pulse interval of the output pulse C2 from the left side optical unit 96 so as to obtain angle data $\theta_2$. The calculating part 101 is connected with the first and second timing circuits 113 and 114 via interfaces 115 and 116. The calculating part 101 calculates the two-dimensional coordinates of a position desired to be input based upon a pair of angle data $\theta_1$ and $\theta_2$, which has been actually measured, using the predetermined coordinates calculation formula (8) described above.

Figure 15:
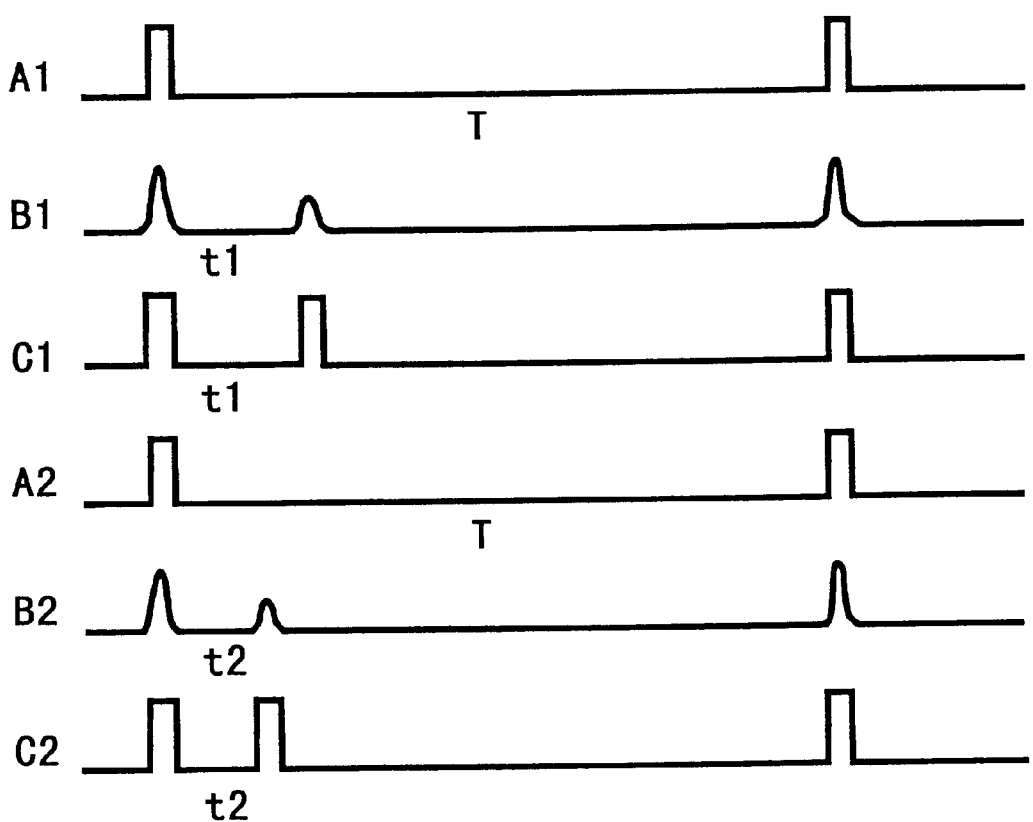
FIG. 15 is a timing chart illustrating waveforms of the electrical circuit of the coordinate inputting/detecting apparatus.

A method of measuring a declination angle is briefly described referring to a timing chart illustrated in FIG. 15. First, when the reflective mirror 98 is rotated in a cycle T at the right side optical unit 95, the timing detect circuit 111 outputs the timing pulse A1 in the cycle T. At this time, the amplifying circuit 112 outputs the detection pulse B1 in synchronism with a light receiving timing of the light receiving element 103. The detection pulse B1 has a large peak and a small peak following the large peak. The large peak is generated when the reflective mirror 98 is perpendicular to a light flux from the light source 97. The large peak of the detection pulse B1 is in synchronism with the timing pulse A1, and is not related to a returning light from the cursor 94. The small peak following the large peak is in synchronism with a timing that a returning light from the cursor 94 is received by the light receiving element 103, and if the small peak is assumed to have been generated a time t1 after the large peak, the time t1 is proportionally related to the angle data $\theta_0+\theta_1$, which is desired to be obtained. The wave form processing circuit 107 processes the wave forms of the timing pulse A1 and the detection pulse B1 and outputs the output pulse C1.

A similar operation is performed at the left side optical unit 96. A rotation cycle and phase of the reflective mirror 100 coincides with that of the right side optical unit 95, and therefore a same timing pulse A2 as the timing pulse A1 is obtained. A detection pulse B2 has a large peak, which is followed by a small peak a time 2 thereafter. A returning light from the cursor 94 is received at the timing of the small peak. An output pulse C2 is obtained based upon the timing pulse A2 and the detection pulse B2, and a time t2 between the large and small peaks is proportionally related to the angle data $\theta_0+\theta_2$ which is desired to be obtained.

Then, the first timing circuit 113 times the pulse time interval t1 of the output pulse C1 and obtains the angle data $\theta_1$ by subtracting a known attaching angle $\theta_0$. Also, the second timing circuit 114 times the pulse time interval t2 of the output pulse C2, and obtains the angle data $\theta_2$ by subtracting a known attaching angle $\theta_0$.

In the above embodiment, the coordinate inputting/detecting apparatus 1 using a returning light interrupting system, the coordinate inputting/detecting apparatus 61 using a camera photographing system, the coordinate inputting/detecting system 91 using a rotation scanning system including a pen having a reflective plate, and the coordinate inputting/detecting apparatus 51 using an LED array have been demonstrated as examples. However, the present invention can be applied in general to any optical coordinate inputting/detecting apparatuses in which a coordinate inputting/detecting area is formed at a front surface of a touch panel.

Figure 16:
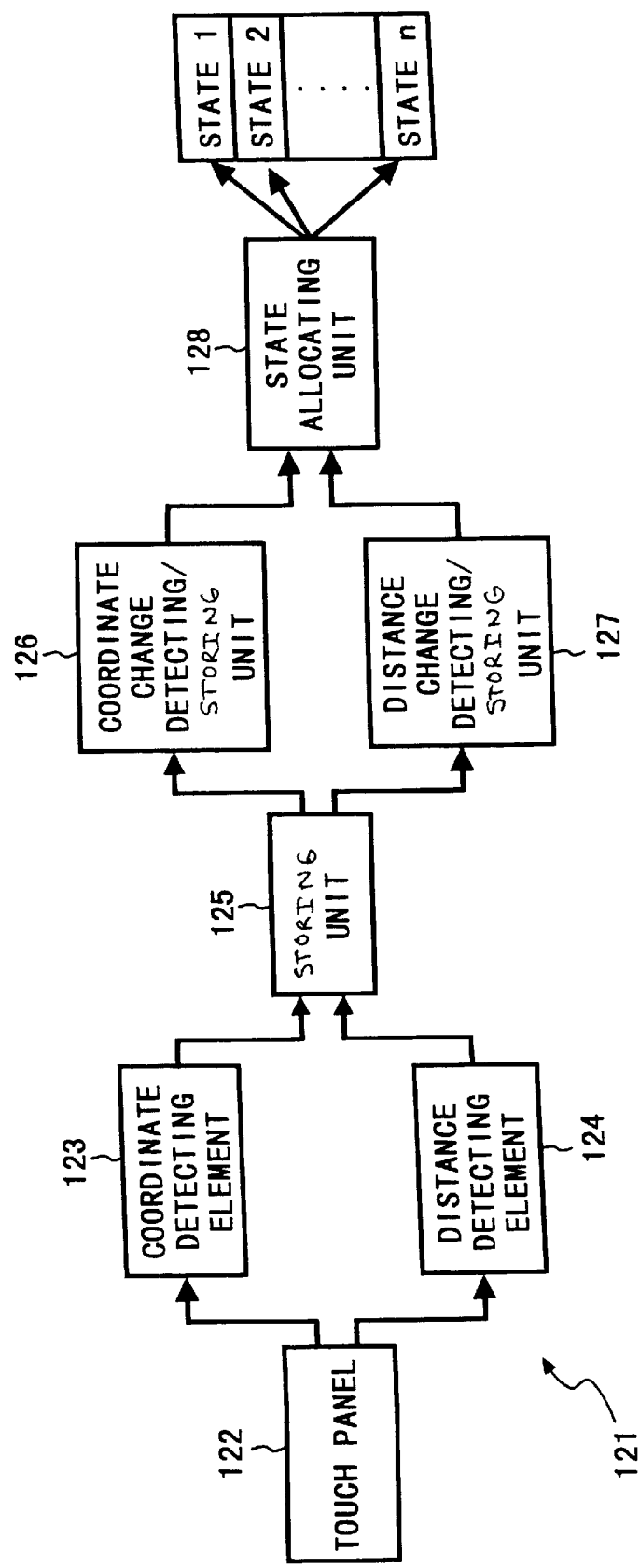
FIG. 16 is a block diagram of a coordinate inputting/detection apparatus having a characteristic configuration of a first example according to the present invention.

Now, a first characteristic example of the configuration of a coordinate inputting/detecting apparatus, according to the present invention, is described with reference to FIG. 16 and FIG. 17. FIG. 16 is a block diagram of a coordinate inputting/detection apparatus 121 having a characteristic configuration according to the first example. The configuration of the coordinate inputting/detecting apparatus 121 can be applied to any of the aforementioned coordinate inputting/detecting apparatuses 1, 51, 61 and 91. In the diagram, a touch panel 122 corresponds to the coordinate inputting/detecting areas 3, 37, 76, and 92. The coordinate inputting/detecting apparatus 121 includes a coordinate detecting element 123 which detects two-dimensional coordinates of a designating device on the touch panel 122, for example, the designating device 4, such as a finger, when the designating device 4 is inserted in the vicinity of a surface of the coordinate inputting/detecting area 3, and a distance detecting element 124 which detects a distance of the designating device 4 from the surface of the touch panel 122.

In a case of the coordinate inputting/detecting apparatus 1, the coordinate detecting element 123 includes the light source 21, the light receiving element 13, and the light returning reflective member 7, and is configured so that the two-dimensional coordinates of the designating device 4 in the coordinate inputting/detecting area 3 can be detected according to the presence of the designating device 4, having a light interrupting property, in a light emitting/light receiving optical path formed in the coordinate inputting/detecting area 3 via the light returning reflective member 7. The distance detecting element 124 is configured so that the distance of the designating device 4 from the surface of the coordinate inputting/detecting area 3 can be detected based on the intensity of an optical beam which is received by the light receiving element 13. In this case, as the designating device 4 approaches the surface of the coordinate inputting/detecting area 3, an amount of the interrupted light increases. Hence, the dip of intensity of light is deepened.

Further, in a case of the coordinate inputting/detecting apparatus 51, the coordinate detecting element 123 includes the plurality of LEDs 52 and 54 and the plurality of phototransistors 53 and 55, and is configured so that the two-dimensional coordinates of the designating device 59 in the coordinate inputting/detecting area 57 can be detected according to the presence of the designating device 59, having a light interrupting property, in a light emitting/light receiving optical path formed in the coordinate inputting/detecting area 57. The distance detecting element 124 is configured so that the distance of the designating device 59 from the surface of the coordinate inputting/detecting area 57 can be detected based on the intensity of an optical beam which is received by the phototransistors 53 and 55. Also in this case, as the designating device 59 approaches the surface of the coordinate inputting/detecting area 57, an amount of the interrupted light increases. Hence, the dip of intensity of light is deepened.

In a case of the coordinate inputting/detecting apparatus 61, the coordinate detecting element 123 includes the infrared rays CCD cameras 63a and 63b, and the calculation circuit 78 which functions as a converting device, and the distance detecting element 124 is configured so that the distance of the pen-like shaped coordinate inputting part 65 as the designating device from the surface of the coordinate inputting/detecting area 66 is detected based on the density information of an image input by the infrared rays CCD cameras 63a and 63b. In this case, as the coordinate inputting part 65 approaches the surface of the coordinate inputting/detecting area 66, an amount of the reflected light increases. Hence, the intensity of light for the part increases and the density is thinned.

In a case of the coordinate inputting/detecting apparatus 91, the coordinate detecting element 123 includes the fixed light sources 97 and 99, and the light receiving elements 103, and is configured so that the two-dimensional coordinates of the cursor 94, having the light reflective member 108, can be detected according to the light-intensity distribution according to the insertion position of the cursor 94 in the coordinate inputting/detecting area 92, and the distance detecting element 124 is configured so that the distance of the cursor 94 from the surface of the coordinate inputting/detecting area 92 is detected based on the intensity of an optical beam received by the light reception elements 103. In this case, as the cursor 94 approaches the surface of the coordinate inputting/detecting area 92, an amount of the reflected light from the cursor 94 increases. Hence, the dip of intensity of light is increased (reversed with the case of a light interrupting system).

From the coordinate detecting element 123 and the distance detecting element 124, for example, the coordinates (x0, y0) of a finger which is located in the vicinity of the touch panel 122 at time t0 and the distance D0 of the finger from the surface of the touch panel 122 are output, and the coordinates (x0, y0) and the distance (D0) are associated with each other as the information detected at the same time t0, and are stored in a memory (not shown) by a storing unit 125. Similarly, predetermined n pieces of set information (X1, y1, D1), (x2, y2, D2), (x3, y3, D3), . . . , (xn, yn, Dn) of the two-dimensional coordinates and distance detected by the coordinate detecting element 123 and the distance detecting element 124 are sequentially stored in time series at subsequent sampling times t1, t2, t3, . . . and tn at predetermined time intervals. Because the set information of the two-dimensional coordinates and distance is sequentially output from the coordinate detecting element 123 and the distance detecting element 124, when new set information of the two-dimensional coordinates and distance is detected, the new set information is stored and the oldest past data is sequentially erased. Accordingly, in a steady state, the n sets of the set information of the two-dimensional coordinates and distance are always stored.

A coordinate change detecting/storing unit 126 and a distance change detecting/storing unit 127 are provided at the rear stage of the storing unit 125. The coordinate change detecting/storing unit 126 obtains differentiation or differences of the time series data of the two-dimensional coordinates stored in the storing unit 125, thereby calculating a change of the coordinates and storing the change in a further storage (not shown). For differentiation, a simple method of obtaining differences of adjacent coordinate value columns or a method of obtaining smoothing differentiation regarding n pieces of stored time series data of the two-dimensional coordinates may be used. Similarly, the distance change detecting/storing unit 127 obtains differentiation or differences of the time series data of the distance information stored in the storing unit 125, thereby calculating a change of the distance information and storing the change in a further storage (not shown). For differentiation, a simple method of obtaining differences of adjacent distance information value columns or a method of obtaining smoothing differentiation regarding n pieces of stored time series data of the distance information may be used.

A state allocating unit 128 is provided at the rear stage of the coordinate change detecting/storing unit 126 and the distance change detecting/storing unit 127. The state allocating unit 128 selects one (for example, state 1) of n pieces of states (state 1, state 2, . . . , and state n) regarding the designating state of a designating device previously set and stored in a storage (not shown) based on the coordinate change information and the distance change information calculated by the coordinate change detecting/storing unit 126 and the distance change detecting/storing unit 127, and outputs the information of the selected state as the currently designating state of the designating device. Here, the designating states may include, as typical examples, inserted and non-inserted (attached and detached) states of the designating device relative to the touch panel 122. In addition, for example, the designating states may also include state information, such as approaching and being separated states of the designating device relative to the touch panel 122. Thus, the designating states of a designating device may properly be set according to an application or purpose.

Therefore, according to a first characteristic configuration example of the present invention, regarding a state of a designating device, because the information about the distance of the designating device from the surface of the touch panel 122 as well as the two-dimensional coordinates of the designating device on the touch panel 122 are obtained, an inputting state of the designating device relative to the touch panel 122, which could not be recognized from only the two-dimensional coordinates, can be recognized, and the inputting state can be reflected in various operating states of a coordinate inputting/detecting system, thereby realizing a smooth coordinate inputting operation.

The operation of the coordinate inputting/detecting apparatus 121 having the above-described characteristic configuration of the first example can also be executed by allowing a computer to read a program previously stored in an FD or CD-ROM. For example, referring to the example shown in FIG. 6, the FD 37 and the CD-ROM 39 are provided, in addition to the ROM 32 and the ROM 33, as information storage mediums for storing programs and for providing the stored programs to a computer, in particular, to the CPU 31. A control program for allowing the CPU 31 to execute various processing operations, in particular, the processing functions which correspond to the operations described above with respect to the above-described first characteristic configuration example of a coordinate inputting/detecting apparatus, can be previously set as software and stored in the CD-ROM 39, for example. The control program is copied into the RAM 33 when the CPU 31 is started, and is read by the CPU 31 when the CPU 31 is operating. Various processing functions are realized by allowing the CPU 31 to read various programs in this manner and to execute the corresponding processings. Therefore, the computer results in executing the coordinate inputting/detecting processing described above.

Figure 17:
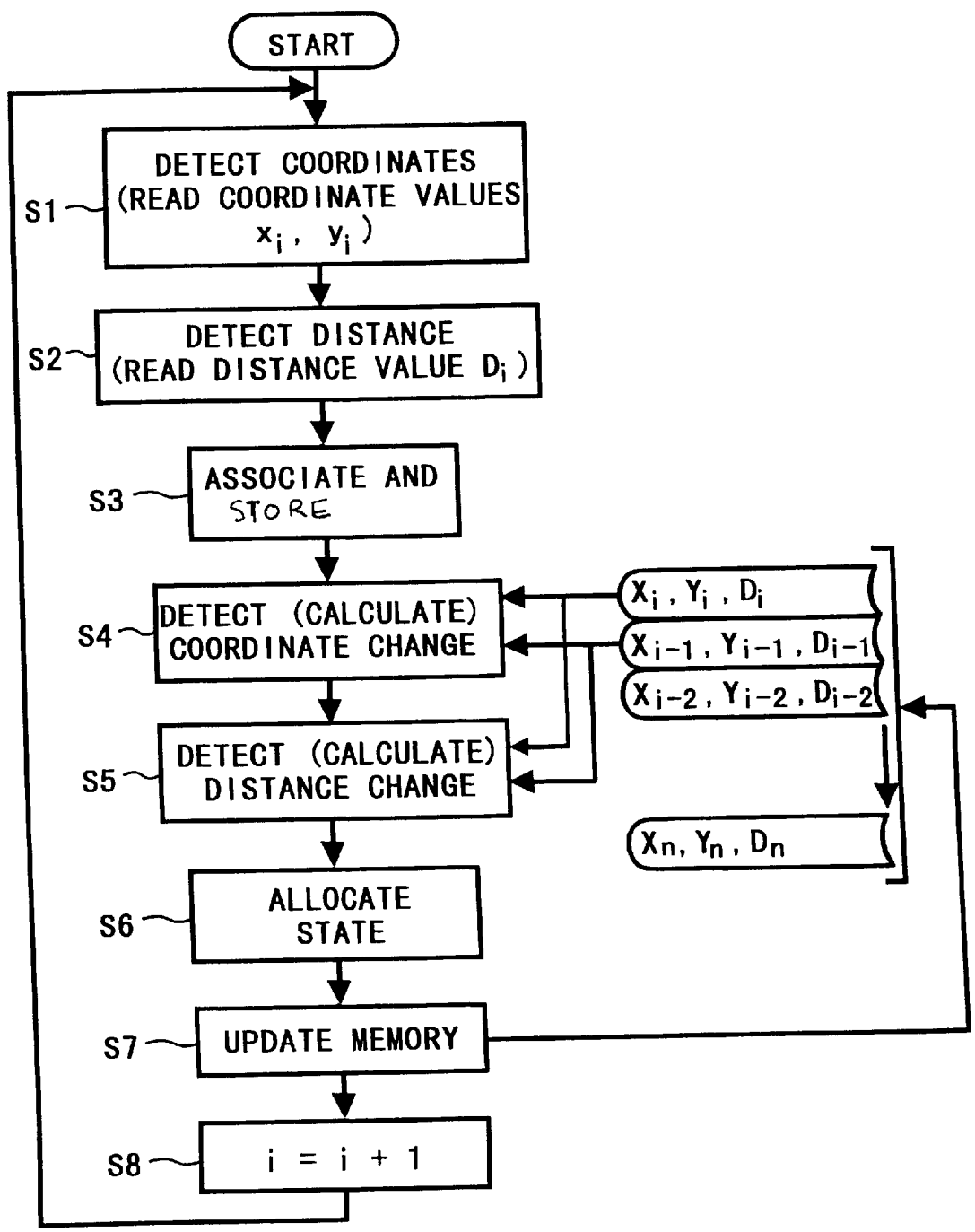
FIG. 17 is a flowchart illustrating an exemplary operation of the coordinate inputting/detecting apparatus having a characteristic configuration of the first example.

FIG. 17 is a flowchart illustrating an exemplary operation of the coordinate inputting/detecting apparatus 121 having the above-described characteristic configuration of the first example. A program for allowing a computer to execute the functions illustrated in FIG. 17 and described below may be stored in an information storage medium, such as the CD-ROM 39. The operation of the coordinate inputting/detecting apparatus 121 includes the following steps. A coordinate detection function (step S1) detects two-dimensional coordinates $x_i$, $y_i$ of the designating device in the touch panel 122. A distance detection function (step S2) detects distance $D_i$ of the designating device from the surface of the touch panel 122 when the designating device is located on the touch panel 122 (or in the vicinity thereof). An associating and storing function (step S3) associates the two-dimensional coordinates information, detected using the coordinate detection function, and the distance information, detected using the distance detection function, with each other such as $(x_i, y_i, D_i)$ and stores the associated information in a memory. A coordinate change detecting/storing function (step S4) detects a change of the two-dimensional coordinates information stored in the memory using the storing function, at predetermined time intervals, according to $\sqrt{\{(x_i-x_{i-1})+(y_i-y_{i-1})\}}$, and stores the detected change in the memory. A distance change detecting function (step S5) detects a change of the distance information stored in the memory using the storage function (step S3), at the predetermined time intervals, according to $(D_i-D_{i-1})$, and stores the detected change in the memory. And, a state allocating function (step S6) allocates at least one designating state among one or more previously stored designating states of the designating device based on the coordinate change information detected using the coordinate change detecting function and stores in the memory and the distance change information detected using the distance change detecting function and stored in the memory.

Figure 18:
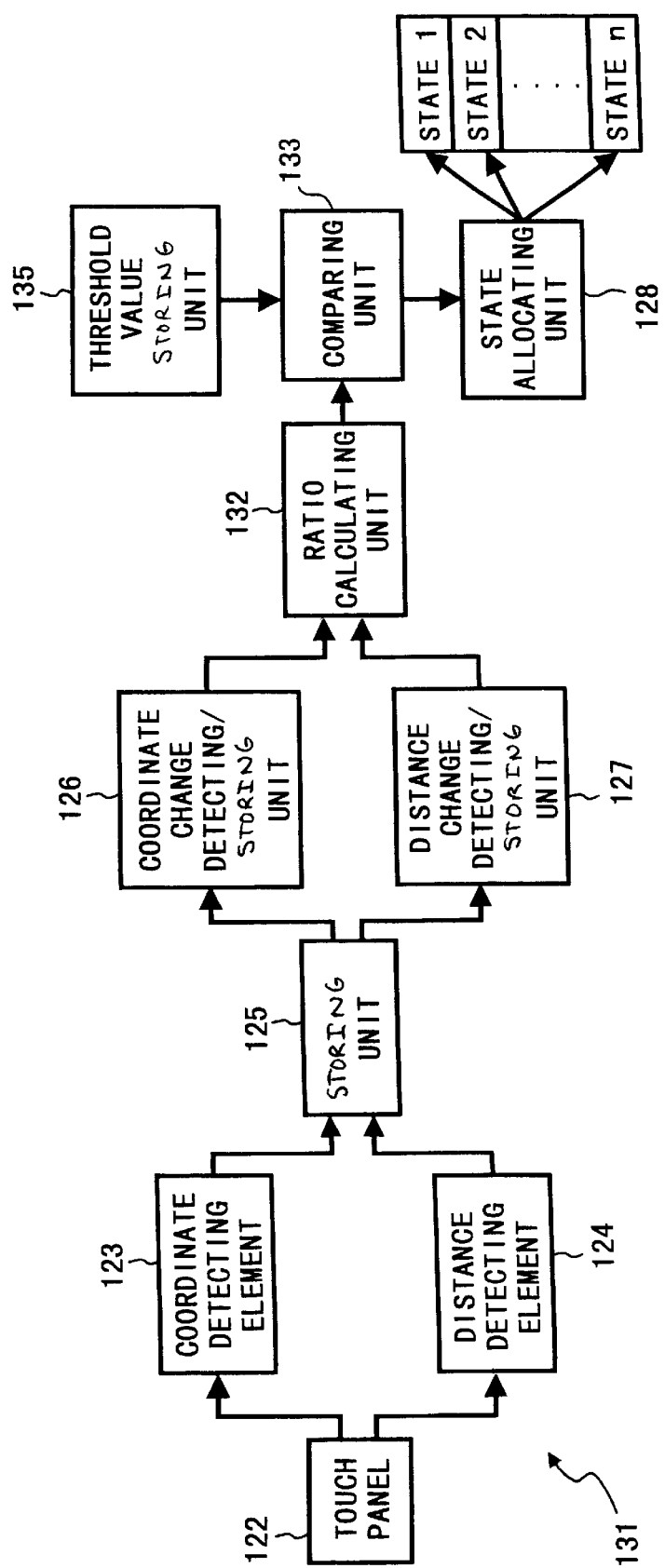
FIG. 18 is a block diagram of a coordinate inputting/detection apparatus having a characteristic configuration of a second example according to the present invention.

Now, a second characteristic example of the configuration of a coordinate inputting/detecting apparatus, according to the present invention, is described with reference to FIG. 18 and FIG. 19. FIG. 18 is a block diagram of a coordinate inputting/detection apparatus 131 having a characteristic configuration of the second example. The same parts as the parts illustrated in the first characteristic example are illustrated using the same reference numerals, and the description thereof is omitted (this applies to subsequent characteristic configuration examples in the same manner).

In the second characteristic configuration example, the state allocating 128 is provided at the rear stages of the coordinate change detecting/storing unit 126 and the distance change detecting/storing unit 127 via a ratio calculating unit 132 and a comparing unit 133. The ratio calculating unit 132 calculates a ratio of a distance change detected by the distance change detecting/storing unit 127 to a coordinate change detected by the coordinate change detecting/storing unit 126, that is, a distance change/coordinate change ratio. A threshold value storing unit 135 which stores at least one or more threshold values for the distance change/coordinate change ratio is connected to the comparing unit 133. The comparing unit 133 compares the distance change/coordinate change ratio calculated by the ratio calculating unit 132 and a predetermined threshold value stored in the threshold value storing unit 135, and outputs a comparison result to the state allocating unit 128.

The state allocating unit 128 selects one (for example, state 1) from among n states (state 1, state 2, . . . , state n) regarding the designating states of a designating device previously set and stored in a memory (not shown) based on the comparison result by the comparing unit 133, and outputs the information of the selected designating state as the currently designating state of the designating device. Here, the designating states may include, as typical examples, inserted and non-inserted (attached and detached) states of the designating device relative to the touch panel 122. In addition, for example, the designating states may also include state information such as approaching and being separated states of the designating device relative to the touch panel 122. Thus, the designating states of a designating device may properly be set according to an application or purpose.

Hence, according to the second characteristic configuration example of the present invention, regarding the state of a designating device relative to the touch panel 122, because not only the two-dimensional coordinates of the designating device on the touch panel 122 and the information about the distance from the surface of the touch panel 122 is obtained, but since also the ratio of the change of the coordinates and the distance is obtained, an inputting state of the designating device relative to the touch panel 122, which could not be recognized from only the two-dimensional coordinates and the distance information, can be recognized in more detail, including the movement of the designating device, and the inputting state can be reflected in various operating states of a coordinate inputting/detecting system, thereby realizing a smooth coordinate inputting operation.

The operation of the coordinate inputting/detecting apparatus 131 having the above-described characteristic configuration of the second example can also be executed by allowing a computer to read a program previously stored in an FD or CD-ROM. For example, a program for allowing a computer to execute the functions illustrated in FIG. 19 and described below may be stored in an information storage medium, such as the CD-ROM 39 of FIG. 6.

Figure 19:
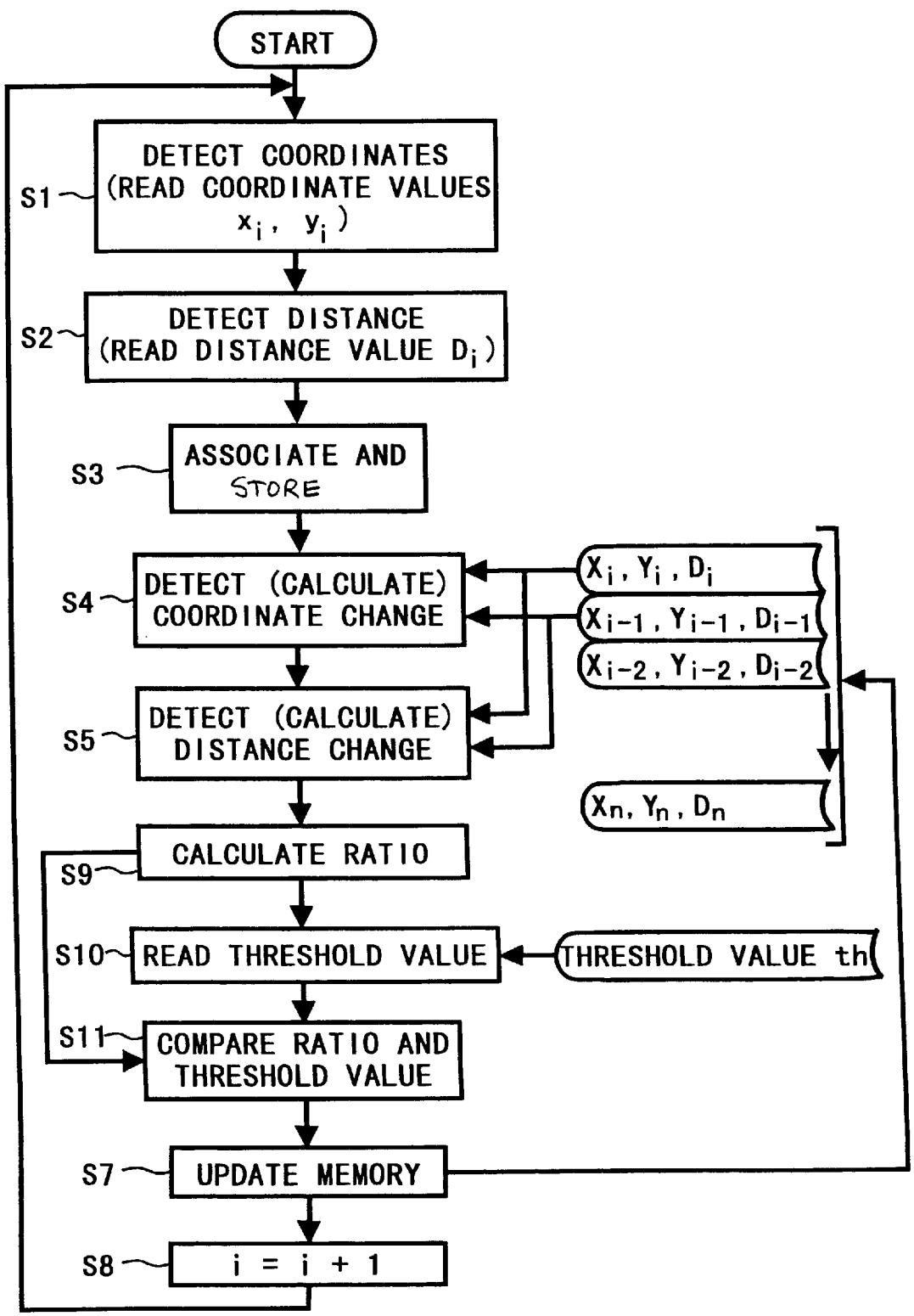
FIG. 19 is a flowchart illustrating an exemplary operation of the coordinate inputting/detecting apparatus having a characteristic configuration of the second example.

With reference to FIG. 19, the operation of the coordinate inputting/detecting apparatus 131 includes, for example, the following funtions. A coordinate detection function (step S1) detects two-dimensional coordinates $x_i$, $y_i$ of a designating device on the touch panel 122. A distance detection function (step S2) detects distance D, from the surface of the touch panel 122 when the designating device is located on the touch panel 122 (or in the vicinity thereof). An associating and storing function (step S3) associates the two-dimensional coordinates information detected using the coordinate detection function and the distance information detected using the distance detection function such as $(x_i, y_i, D_i)$ and stores the associated information in a memory. A coordinate change detecting/storing function (step S4) detects a change of the coordinates change information stored in the memory using the storing function (step S3), at predetermined time intervals, according to $\sqrt{(x_i-x_{i-1})+(y_i-y_{i-1})\}}$, and stores the detected change in the memory. A distance change detecting/storing function (step S5) detects a change of the distance information stored in the memory using the storing function (S3), at the predetermined time intervals, according to $(D_i-D_{i-1})$, and stores the detected change in the memory. A ratio calculating function (step S9) calculates a ratio of a distance change detected using the distance change detecting/storing function (step S5) to a coordinate change detected using the coordinate change detecting/storing function (step S4) according to $(D_i-D_{i-1})/\sqrt{\{(x_i-x_{i-1})+(y_i-y_{i-1})\}}$. And, a comparing function and a state allocating function (steps S10 and S11) compare the ratio calculated using the ratio calculating function (step S9) and a predetermined threshold value th regarding the ratio previously stored in the memory and allocate at least one designating state among the previously stored one or more designating states of the designating device based on the comparison result obtained using the comparing function.

Figure 20:
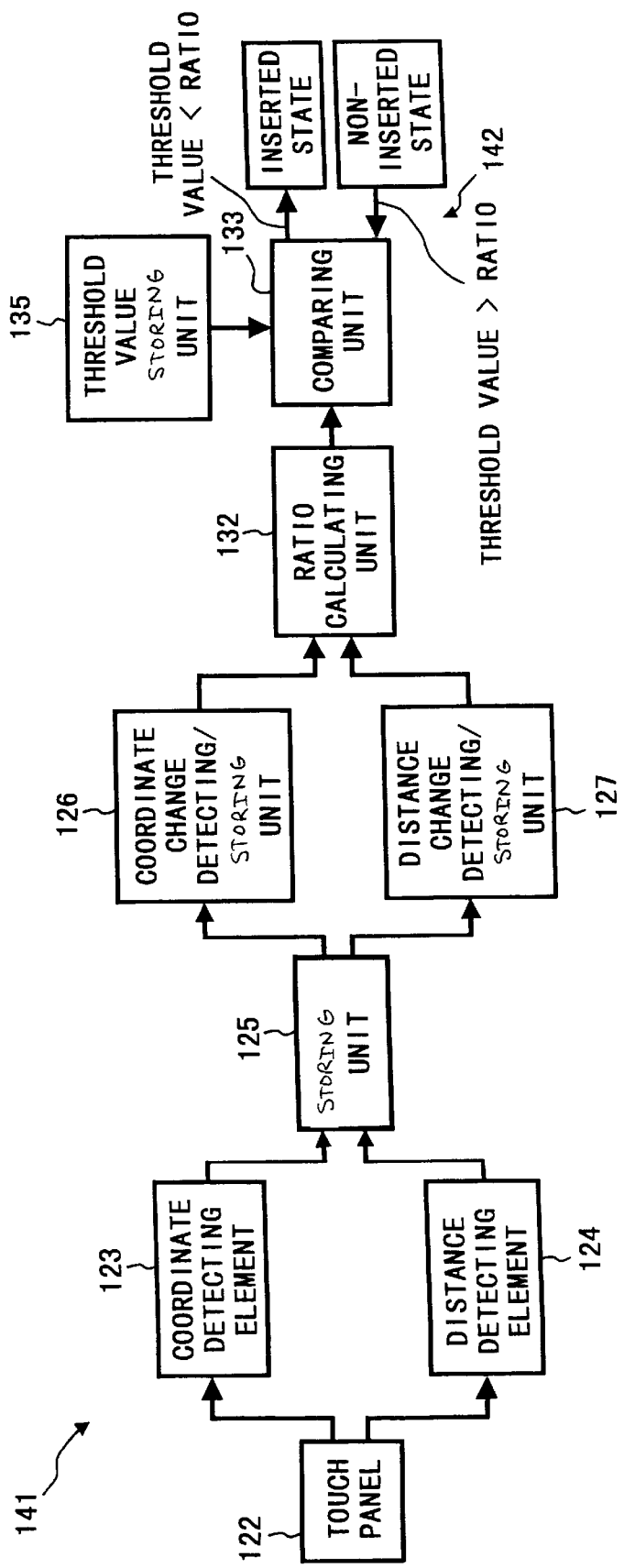
FIG. 20 is a block diagram of a coordinate inputting/detecting apparatus having a characteristic configuration of a third example according to the present invention.

A third characteristic example of the configuration of a coordinate inputting/detecting apparatus, according to the present invention, is described with reference to FIG. 20 through FIG. 28. FIG. 20 is a block diagram of a coordinate inputting/detecting device 141 having a characteristic configuration of the third example.

In the coordinate inputting/detecting device 141 having a characteristic configuration of the third example, the state allocating unit 128 is configured by the comparing unit 133 and the threshold value storing unit 135, so that, according to the result of the comparison by the comparing unit 133, the state allocating unit 128 determines that the designating state of a designating device, such as a finger, is in the non-inserted (detached) state relative to the touch panel 122 if the ratio of a distance change to a coordinate change exceeds a predetermined threshold value, and in the inserted state (attached) relative to the touch panel 122 if the ratio of the distance change to the coordinate change is below the predetermined threshold value.

Figure 21A:
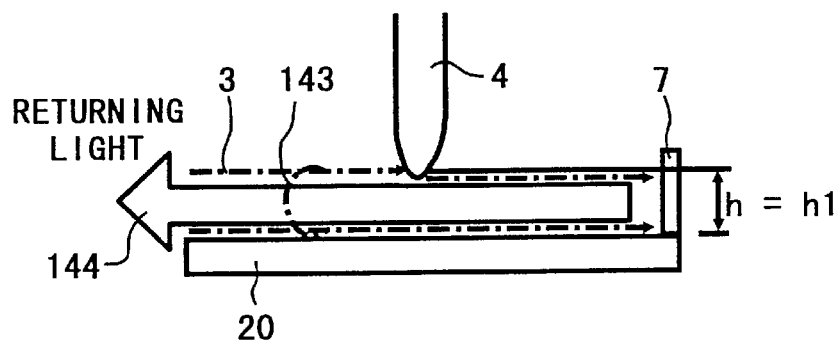
FIGS. 21A–21C are cross-sections illustrating an exemplary coordinate inputting operation, viewed from the direction which is parallel to the surface of a coordinate inputting/detecting area set in front of a display surface.
Figure 21B:
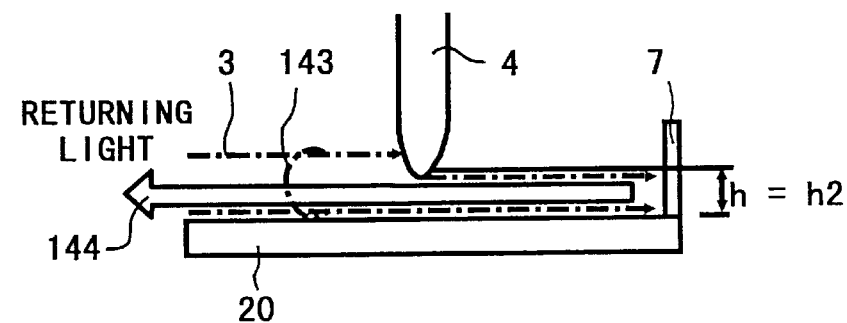
Figure 21C:
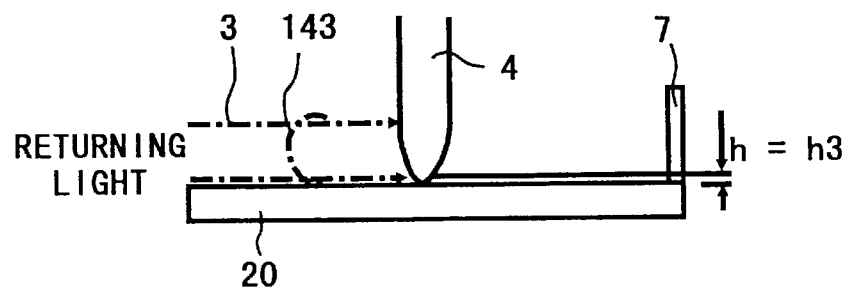

Here, taking the aforementioned exemplary construction of a coordinate inputting/detecting apparatus illustrated in FIGS. 1–6 as an example and referring to FIGS. 21A–21C through FIG. 25, an inputting/detecting operation of the coordinate inputting/detecting apparatus 141 having a characteristic configuration of the third example is described in detail. FIGS. 21A–21C are, in the same manner as for FIG. 5, for example, cross-sections viewed from the direction parallel to the surface of the coordinate inputting/detecting area 3 set in the front of the display surface 20, and FIGS. 22A–22C are characteristic diagrams of light-intensity distribution in each of the cases illustrated in FIGS. 21A–21C. In FIGS. 21A–21C, a light source and a light receiving element are omitted. Further, in those figures, a detecting light 143 is propagated from left to right and is reflected by the light returning reflective member 7 so as to inversely progress, through the same route the detecting light 143 propagated toward the light returning reflective member 7, as returning light 144.

First, FIG. 21A illustrates a state in which the designating device 4 such as a finger is located in distance h=h1 from the display surface 20 in the coordinate inputting/detecting area 3. At this time, because the designating device 4 is in the state in which only a small amount of the returning light 144 is interrupted, the intensity distribution of the returning light 144 detected by the light receiving element 13 produces a dip which decreases by d=d1 as illustrated in FIG. 22A. FIGS. 21B and 21C illustrate the state in which the distance of the designating device 4 from the display surface 20 is h=h2 and h=h3 in the coordinate inputting/detecting area 3, respectively. At this time, an amount that the returning light 144 is interrupted is varied depending on the distance h of the designating device 4. FIG. 23 is a characteristic diagram illustrating the state in which a dip amount in the light intensity distribution is varied in accordance with the distance (position) of the designating device 4 from the display surface 20. As a result, the distance h of the designating device 4 from the display surface 20 device 4 appears as the size of a dip amount d in the light intensity distribution detected by the light receiving element 13. The principle on which two-dimensional coordinates in which the designating device 4 is located are obtained from the dip position in the intensity distribution of the returning light has been described above, in particular referring to FIG. 3. Further, by detecting such dip amount d, the distance h from the display surface 20 of the designating device 4 can be detected.

Figure 24A:
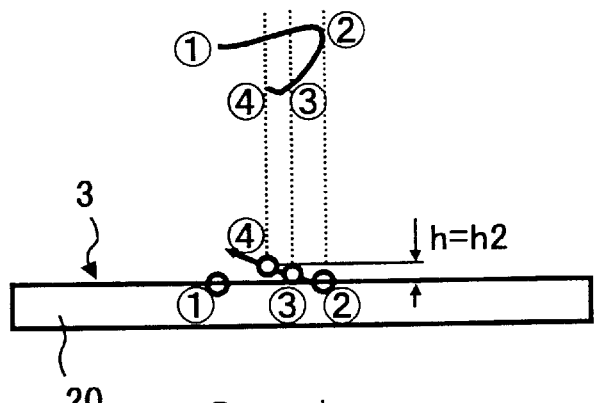
FIGS. 24A and 24B are explanatory diagrams illustrating sectional views of a trace of a fingertip in drawing characters.
Figure 24B:
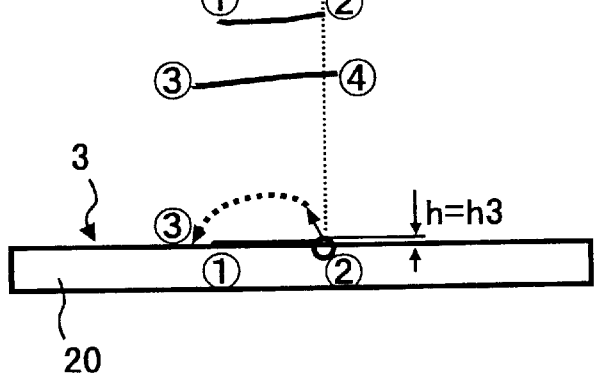

Next, a method of determining whether the designating device 4 is in the inserted state (contact state to the display surface 20) or the non-inserted state (separated state from the display surface 20) is described using the distance information for the designating device 4. FIGS. 24A and 24B collectively illustrate the relationship between a track of a fingertip of a finger, as the designating device 4, when drawing a character on the display surface 20 via the coordinate inputting/detecting area 3, and the distance h of the fingertip from the surface of the display surface 20, when the display surface 20 is viewed in terms of a cross-section.

As specific examples, FIG. 24A and FIG. 24B are diagrams in which a Japanese Hiragana character "つ" ("tsu") and a Japanese Kanji character "二" ("ni") are drawn, respectively.

Figure 34A:
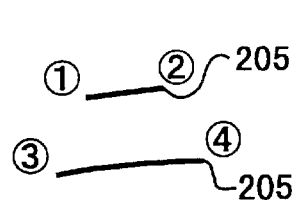
FIGS. 34A–34F are exaggerated drawings for explaining examples of structures of representative Japanese characters and examples of drawing such characters.

First, in drawing the Hiragana character "つ" ("tsu"), as illustrated in FIG. 24A, a fingertip follows a route shown in the order of points ①, ②, ③ and ④. At this time, the distance h of the fingertip from the display surface 20 is zero up to the points ①, ②, ③ and the fingertip makes contact with the display surface 20. However, between the points ③ and ④, the fingertip follows the drawing operation of the sweeping portion 207 (see FIGS. 34E and 34F) at the end of the character "つ" ("tsu"), and performs the operation in which the fingertip slowly separates from the display surface 20. At this time, in order to satisfactorily detect the sweeping portion 207 at the end of the coordinates which construct the character "つ" ("tsu") to be drawn, a threshold value for the dip detection on the light receiving element 13 is set to a value from which h=h2 can be detected, that is, a threshold value A (see FIG. 23). If the dip amount exceeds the threshold value A, it is determined that the fingertip is in the attached state, i.e., in the inserted state, and the coordinates of the fingertip are output as input coordinates.

Figure 34B:
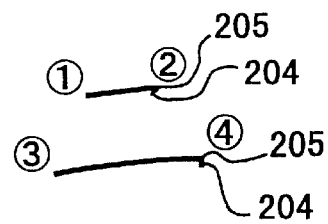

On the other hand, in drawing the Kanji character "二" ("ni"), as illustrated in FIG. 24B, the fingertip moves to a point ③ after having drawn a stroke between points ① and ②. Then, the distance of the fingertip from the display surface 20 is as illustrated in the following diagram of FIG. 24B. That is, when the fingertip moves to the point ② to reach the ending portion 205 (see FIGS. 34A and 34B), after having drawn the first stroke of kanji "二" ("ni"), the fingertip is steeply separated from the display surface 20, and moves in accordance with an aerial track illustrated by a dotted line and reaches a point ③. At this time, if the determination as to the insertion/non-insertion state of the fingertip is made using the same threshold value A as in FIG. 24A, then, even if the distance of the fingertip exceeds h=h3 in the vicinity where the first stroke has been drawn up to the point ②, the dip distance exceeds the threshold value A when h<h2. Thus, this case is determined as the inserted (attached) state, and as a result, the second stroke is not disconnected satisfactorily, and as illustrated in FIG. 34B, the whisker-shaped trailing 204 occurs in the ending portion 205. Accordingly, in order to satisfactorily detect the state of a designating device in the vicinity of such an ending portion of a character, it is necessary to change the threshold value, for example, from the threshold value A to a threshold value B (FIG. 23). However, it is exceedingly difficult to automatically process such a change of the threshold value.

Figure 25A:
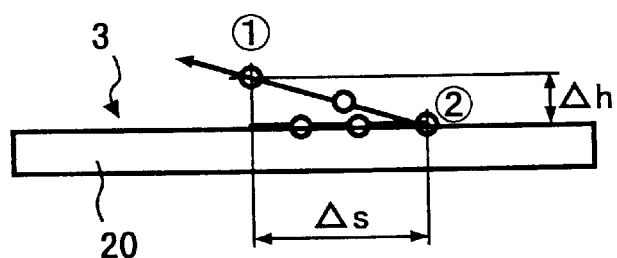
FIGS. 25A and 25B are explanatory diagrams schematically illustrating sectional views of the trace of the fingertip illustrated in FIGS. 24A and 24B, slightly enlarged.
Figure 25B:
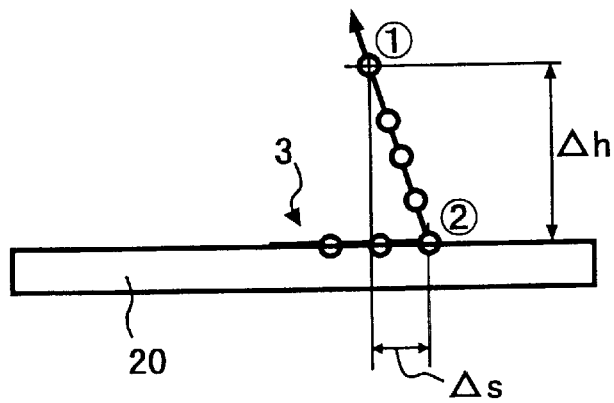
Figure 26:
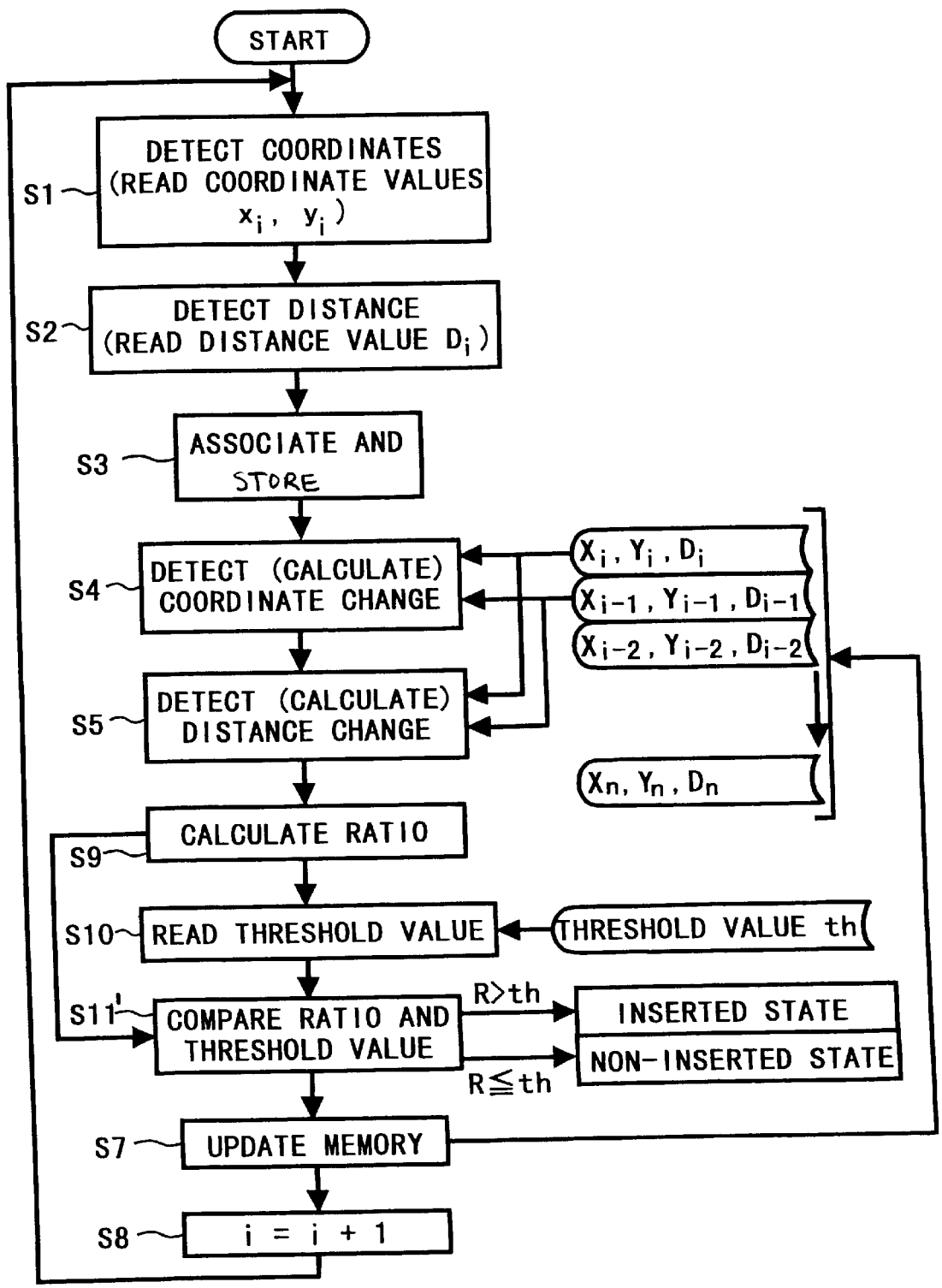
FIG. 26 is a flowchart illustrating an exemplary operation of the coordinate inputting/detecting apparatus having a characteristic configuration of the third example.

In a characteristic configuration of the third example of the present invention, the above difficulty is addressed by paying attention to a ratio of a distance change to a coordinate change, which is described with reference to FIGS. 25A and 25B. FIGS. 25A and 25B are explanatory diagrams schematically illustrating sectional views of the trace of the fingertip illustrated in FIGS. 24A and 24B, slightly enlarged. In FIGS. 25A, 25B, the portion marked by a circle shows a sampling point of coordinates sampled at predetermined time intervals. The trace of the fingertip clearly differs between the sweeping portion 207 (illustrated in FIG. 24A) and the ending portion 205 (illustrated in FIG. 24B), as illustrated in FIGS. 25A and 25B. That is, in the sweeping portion 207, because the fingertip continuously moves following the drawing of the sweeping portion 207, the fingertip is slowly separated from the display surface 20. However, in the ending portion 205, the fingertip is steeply separated from the display surface 20. By detecting the difference of such movement, the sweeping portion 207 (same as the sweeping up portion 206 illustrated in FIGS. 34C and 34D) and the ending portion 205 can definitely be distinguished.

Specifically, distinguishing the sweeping portion 207 and the sweeping up portion 206 from the ending portion 205 is performed according to the size of a ratio of a distance change to a coordinate change. As described previously, in the coordinate change detecting/storing unit 126, a coordinate change $\Delta s$ at every sampling is detected, and in the distance change detecting/storing unit 127, a distance change $\Delta h$ at every sampling is detected. Then, in the ratio calculating unit 128, the ratio of the distance change $\Delta h$ to the coordinate change $\Delta s$, that is $\Delta h/\Delta s$, is calculated. In the comparing unit 133, a predetermined threshold value stored in the threshold value storing unit 135 and the ratio $\Delta h/\Delta s$ are compared. As a result of the comparison, if the ratio $\Delta h/\Delta s$ is higher than the threshold value, it is determined that the movement in which the trace of a fingertip is steeply separated from the display surface 20 is performed, as illustrated in FIG. 25B, and thereby it is assumed that the movement after the ending portion 205 has been drawn and it is determined that the fingertip has immediately shifted to the non-inserted or separated state (detached state). On the other hand, as a result of the comparison, if the proportion $\Delta h/\Delta s$ is below the threshold value, it is determined that the movement in which the fingertip is moving while making contact with the display surface 20, or the trace of the fingertip is slowly separated from the display surface 20 following the sweeping portion 207, as illustrated in FIG. 25A, is performed, and thereby it is determined that the fingertip is in the inserted state (attached state).

In FIGS. 25A and 25B, the trace of the fingertip is illustrated as a change from the point ② to the point ①. In the practical processing operation, the sweeping portion 207 and the sweeping up portion 206 can be appropriately distinguished from the ending portion 205 by fully shortening the sampling intervals of the sampling points marked by a circle and sequentially obtaining the difference between respective sampling points, and thereby obtaining the information about the coordinate change and distance change in the trace of the fingertip.

Thus, according to a third characteristic configuration example, an inputting state of a designating device can be recognized more properly and an appropriate processing is enabled by more practically paying attention to a natural and different movement of the designating device such as a finger in the sweeping portion 207, the sweeping up portion 206 and the ending portion 205 (i.e., such a difference that while a trace of a fingertip is slowly separated from the display surface 20 in the sweeping portion 207 and the sweeping up portion 206, the trace of the fingertip is steeply separated from the display surface 20 in the ending portion 205), by comparing a ratio $\Delta h/\Delta s$ of a distance change to a coordinate change with a previously set predetermined threshold value, and by determining that a designating state of the designating device is in the inserted state or non-inserted state according to the result of the comparison.

The operation of the coordinate inputting/detecting apparatus 141 having the above characteristic configuration of the third example can also be executed by allowing a computer to read a program previously stored in an information storage medium such as an FD or CD-ROM. In a case of a characteristic configuration of the third example, referring to the flowchart illustrated in FIG. 26, in addition to the program for the second characteristic configuration example, with regard to the state allocating function, an additional program may be stored in the information storage medium such as the CD-ROM 39 for allowing a computer to execute a comparing and determining function (step S11') to determine, as a result of the comparison using the comparing function to compare the ratio $\Delta h/\Delta s$ calculated using the ratio calculating function (step S9) and a predetermined threshold value th regarding the ratio previously stored in the memory, that the designating state of a designating device is in the non-inserted state relative to the touch panel 122 if the ratio $\Delta h/\Delta s$ exceeds the threshold value th and the designating state of the designating device is in the inserted state relative to the touch panel 122 if the ratio $\Delta h/\Delta s$ is below the threshold value th.

In the above second and third characteristic configuration examples, for distinguishing the sweeping portion 207 and the sweeping up portion 206 from the ending portion 205, a ratio of a distance change to a coordinate change is used. Instead of using such a ratio, an angle (=tan $\theta=\Delta h/\Delta s$) of a distance change to a coordinate change may be used. For example, it may be set such that if this angle is higher than a previously set predetermined threshold value $\theta$th (for example, about 40 degrees) as illustrated in FIG. 27, it is recognized that the sweeping portion 207 or the sweeping up portion 206 was drawn, i.e., the ending portion 205 was drawn, and if the angle is below the predetermined threshold $\theta$th, it is recognized that the sweeping portion 207 or the sweeping up portion 206 was drawn.

In this case, the angle of the distance change to the coordinate change may directly be calculated. Alternatively, the angle of the distance change to the coordinate change may be determined based on the state of a change of a dip amount in the intensity of light to be detected. That is, at the time of drawing in a manner that the angle is larger than the predetermined threshold value $\theta$th, the dip amount steeply decreases, for example, as illustrated at t=t3 to t=t4 in FIG. 28A. Conversely, at the time of drawing in a manner that the angle is smaller than the predetermined value $\theta$th, the dip amount decreases slowly as illustrated at t=t3, t=t4, and t=t5 in FIG. 28B. Accordingly, the angle of the distance change to the coordinate change may be determined based upon the rapidity of the change of the dip amount.

The operation at the time when such angle information is used can also be executed by allowing a computer to read a program previously stored in an information storage medium such as an FD or CD-ROM in the same manner as described previously.

Figure 30:
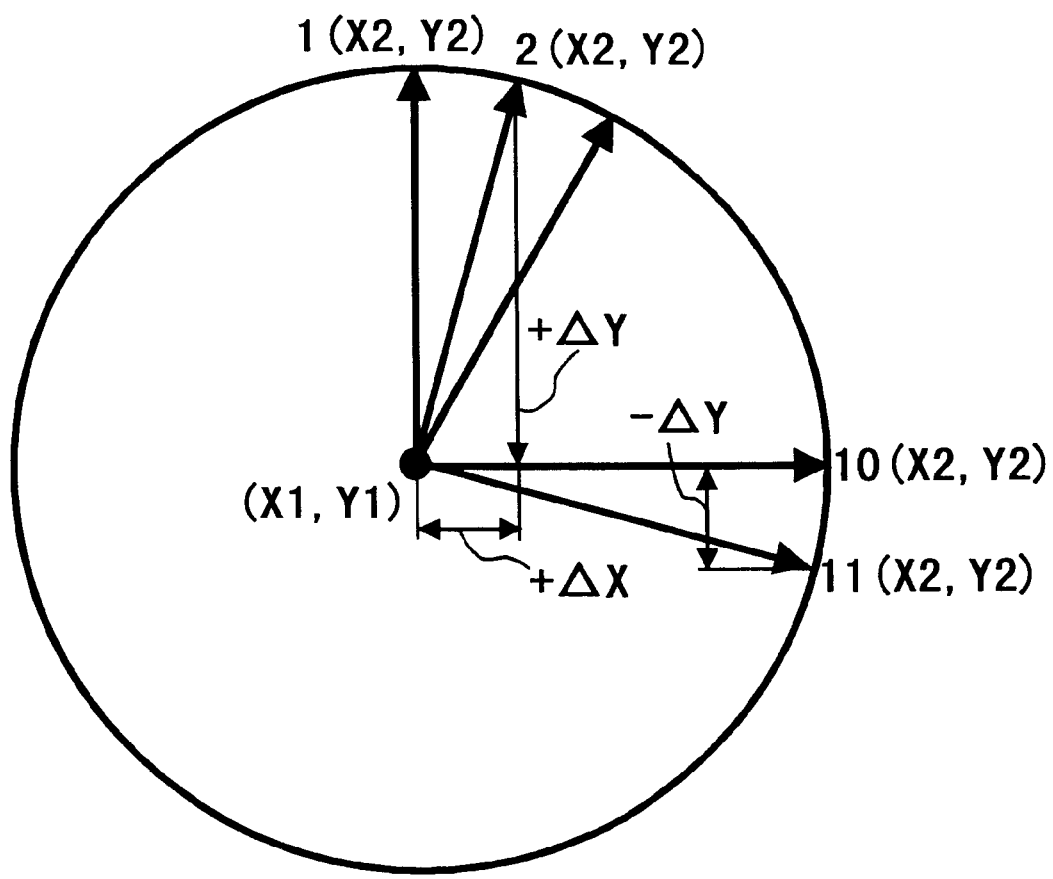
FIG. 30 is a diagram for explaining a method of calculating a coordinates vector value.

Now, a fourth example of a characteristic configuration of a coordinate inputting/detecting apparatus according to the present invention is described with reference to FIG. 29 through FIG. 31. FIG. 29 is a block diagram of a coordinate inputting/detecting device 151 having a characteristic configuration of the fourth example.

Also in the fourth example, attention is paid to the movement of a designating device such as a fingertip which differs in the sweeping portion 207, the sweeping up portion 206, and the ending portion 205, and a coordinates vector value having both direction information and length information on a change of the designated coordinates is used for the determination as to distinguishing the sweeping portion 207 and the sweeping up portion 206 from the ending portion 205.

First, an insertion/non-insertion detecting element 152 is provided to the touch panel 122 in conjunction with the coordinate detecting element 123. As described previously, when a designating device 4, such as a finger, is inserted in the vicinity of the surface of the touch panel 122, the coordinate detecting element 123 detects two-dimensional coordinates of the designating device on the touch panel 122 at predetermined time intervals in time series. Further, the insertion/non-insertion detecting element 152 may simply detect with a light receiving element or the like whether the designating device is at a position to interfere with a detecting light, regardless of whether the designating device such as the finger actually makes contact with the surface of the touch panel 122. For example, in a case of the configuration example illustrated in FIGS. 1–6, the insertion/non-insertion detecting element 152 may be any device which detects whether a dip occurs in the light-intensity distribution of the light receiving element 13.

A vectorization unit 153 is provided at the rear of the coordinate detecting element 123. The vectorization unit 153 performs processing of converting a change between two two-dimensional coordinates (i.e., information of a direction and a length of a line between the two two-dimensional coordinates), which are subsequently obtained in time series by the coordinate detecting element 123 when an inserted state of a designating device is detected, into a coordinates vector value using the vector data previously set and stored in a vector table 154, and of storing the coordinates vector value in a memory.

Here, the method of obtaining a coordinates vector value is described with reference to FIG. 30. In FIG. 30, it is assumed that previously detected two-dimensional coordinates are (X1, Y1) and two-dimensional coordinates currently obtained are (X2, Y2). A coordinates vector value is calculated from a change ΔX=X2−X1 in the X coordinate direction and a change ΔY=Y2−Y1 in the Y coordinate direction according to ΔY/ΔX. In this case, coordinates vector values are expressed in numeric values at intervals of ten degrees from the X-axis direction as listed in Table 1, and are previously stored in the vector table 154. These intervals (ten degrees) may optionally be set. Further, it is assumed that a coordinates vector value uses an approximate value of a calculation result. For example, in a case of ΔY/ΔX=0.900 for −ΔY and −ΔX, the coordinates vector value is 24.

TABLE 1

| Coordinates vector value | ΔX | ΔT | ΔY/ΔX |
|---|---|---|---|
| 1 | 0 | + | ∞ (tan 90°) |
| 2 | + | + | 5.671 (tan 80°) |
| 3 | + | + | 2.747 (tan 70°) |
| 4 | + | + | 1.732 (tan 60°) |
| 5 | + | + | 1.192 (tan 50°) |
| 6 | + | + | 0.839 (tan 40°) |
| 7 | + | + | 0.577 (tan 30°) |
| 8 | + | + | 0.364 (tan 20°) |
| 9 | + | + | 0.176 (tan 10°) |
| 10 | + | 0 | 0 (tan 0°) |
| 11 | + | − | 0.176 (tan 10°) |
| 12 | + | − | 0.364 (tan 20°) |

TABLE 1-continued

| Coordinates vector value | ΔX | ΔT | ΔY/ΔX |
|---|---|---|---|
| 13 | + | − | 0.577 (tan 30°) |
| 14 | + | − | 0.839 (tan 40°) |
| 15 | + | − | 1.192 (tan 50°) |
| 16 | + | − | 1.732 (tan 60°) |
| 17 | + | − | 2.747 (tan 70°) |
| 18 | + | − | 5.671 (tan 80°) |
| 19 | 0 | − | ∞ (tan 90°) |
| 20 | − | − | 5.671 (tan 80°) |
| 21 | − | − | 2.747 (tan 70°) |
| 22 | − | − | 1.732 (tan 60°) |
| 23 | − | − | 1.192 (tan 50°) |
| 24 | − | − | 0.839 (tan 40°) |
| 25 | − | − | 0.577 (tan 30°) |
| 26 | − | − | 0.364 (tan 20°) |
| 27 | − | − | 0.176 (tan 10°) |
| 28 | − | 0 | 0 (tan 0°) |
| 29 | − | + | 0.176 (tan 10°) |
| 30 | − | + | 0.364 (tan 20°) |
| 31 | − | + | 0.577 (tan 30°) |
| 32 | − | + | 0.839 (tan 40°) |
| 33 | − | + | 1.192 (tan 50°) |
| 34 | − | + | 1.732 (tan 60°) |
| 35 | − | + | 2.747 (tan 70°) |
| 36 | − | + | 5.671 (tan 80°) |

Figure 31:
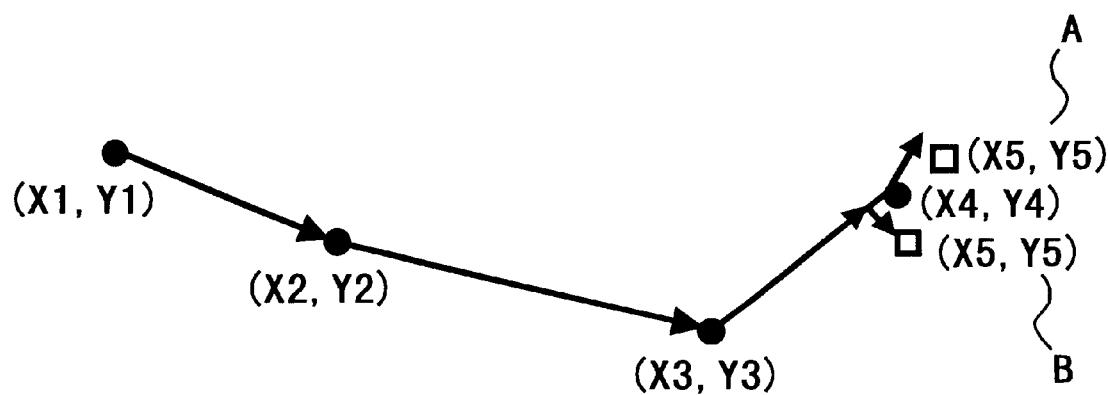
FIG. 31 is a diagram illustrating a change of two-dimensional coordinates according to a movement of a finger.

Further, referring to the movement of a fingertip illustrated in FIG. 31, when the insertion state is detected relative to the touch panel 122, two-dimensional coordinates are sampled at the same time intervals as (X1, Y1), (X2, Y2), (X3, Y3), and (X4, Y4). When the fingertip exits from the detection area, it is assumed that a non-insertion detection (detachment detection) signal is issued from the insertion/non-insertion detecting element 152. In such movement, the coordinates vector value between coordinates in each sampling is calculated as described above, and the length L between the respective coordinates, for example, if the length between coordinates (X1, Y1) and (X2, Y2) is L1, is calculated from the following equation:

$$L1=\sqrt{\{(Y2-Y1)^2+(X2-X1)\}}$$

Thus, the coordinates vector value and the length information are calculated and stored for every sampled coordinates. Table 2 shows a data example converted into coordinates vector values when the movement illustrated in FIG. 28 is performed.

TABLE 2

| Coordinate input | X1, Y1 | X2, Y2 | X3, Y3 | X4, Y4 | X5, Y5 | Detachment |
|---|---|---|---|---|---|---|
| Coordinates vector value | 12 | 11 | 6 | 16 (6) | | |
| Length | L1 | L2 | L3 | L4 | L5 | |

A vector information determining unit 155 is provided at the rear of the vectorization unit 153. The vector information determining unit 155 determines the size of a change in the vector information (coordinates vector value and length) at the time when the change into the non-inserted state (separated or detached state) of a designating device is detected by the insertion/non-insertion detecting element 152. A sweeping up processing unit 156 and an end trailing processing unit 157 are provided at the rear of the vector information determining unit 155 to perform different processing according to the determining result.

The sweeping up processing unit 156 assumes, when the non-insertion of a designating device is detected by the insertion/non-insertion detecting element 152, if there is no great change exceeding a predetermined value (for example, "4" for a coordinates vector value) in the coordinates vector value obtained by the vectorization unit 153, that trailing has occurred in the sweeping portion or the sweeping up portion of a drawn character, and performs processing of shortening a drawing line connecting the two-dimensional coordinates immediately before the non-insertion of the designating device has been detected and the preceding two-dimensional coordinates by a predetermined length. It is usual for the sweeping up portion 206 illustrated in FIGS. 34C and 34D or the sweeping portion 207 illustrated in FIGS. 34E and 34F that a finger advances in the same or almost the same direction when the finger is separated from the touch panel 122. Such movement of a finger is demonstrated by the fact that there is no great change in the coordinates vector values. Therefore, in such a case, the trailing portion 204 occurs following the sweeping up portion 206 or the sweeping portion 207, and the sweeping up portion 206 and the sweeping portion 207 are drawn longer than the intended lengths. Consequently, processing is performed so that a redundant part due to the trailing portion 204 cannot be drawn.

Figure 34C:
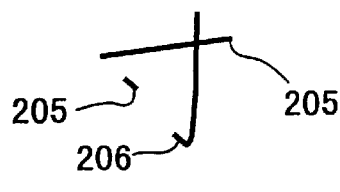
Figure 34D:
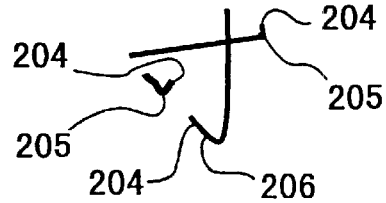
Figure 34E:
Figure 34F:

For example, referring to FIG. 31, when the detached state of a designating device is detected, if the coordinates vector value, calculated from the coordinates (X5, Y5) (side A) detected immediately before the separated state of the designating device is detected, is not greatly changed from the preceding coordinates (X4, Y4), as shown by "6" and "(6)" in Table 2, it is assumed that the trailing portion 204 has occurred in the sweeping up portion 206 between the detected coordinates (X4, Y4) and (X5, Y5) (side A), and the sweeping up portion 206 is drawn by shortening the sweeping up portion 206 by a previously set, fixed length, at a part of the seeping up portion 206 immediately before the detached state is detected. Accordingly, the sweeping up portion 206 or the sweeping portion 207 is drawn in a state having no trailing portion 204 in FIGS. 34D and 34F (that is, drawn in such redundancy-free original state as illustrated in FIGS. 34C and 34E).

On the other hand, when the non-insertion of the designating device is detected by the insertion/non-insertion detecting element 152, if there is a great change exceeding a predetermined value in the coordinates vector value obtained by the vectorization unit 153, the end trailing processing unit 157 assumes that trailing has occurred in the ending portion 205, and performs processing of disabling drawing of the line connecting between the two-dimensional coordinates where the non-insertion detected and the preceding coordinates. It is usually the case of the ending portion 205 illustrated in FIGS. 34A and 34B that after drawing the ending portion 205, a finger steeply advances in a direction which greatly differs from the moving direction before reaching the ending portion 205, because the finger is once stopped at the ending portion 205 and is then separated from the touch panel 122 for moving to a next point to start drawing a subsequent stroke. Such movement of the finger is demonstrated by the coordinates vector value greatly changing and the length being exceedingly shortened. In such a case, because the whisker-shaped trailing portion 204 is drawn in the ending portion 205, processing is performed so that such a trailing portion 204 cannot be drawn.

For example, referring to FIG. 31, when the separated state of the designating device is detected, if the coordinate vector value calculated from the before-preceding detected coordinates (X4, Y4) and the preceding detected coordinates (X5, Y5) (side B) is changed greatly as shown by "6" and "16" in Table 2, it is assumed that trailing has occurred after the coordinates (X4, Y4), and the drawing line after the coordinates (X4, Y4) is disabled so as to terminate with the ending portion 205. Accordingly, the ending portion 205 is drawn in the state having no trailing portion 204 illustrated in FIG. 34B (that is, drawn in a redundancy-free original state as illustrated in FIG. 34A).

Hence, in a fourth characteristic configuration example, attention is paid to the fact that it is more practically usual that, when a designating device such as a finger is separated from the touch panel 122 in the sweeping up portion 206 of a Kanji character, the designating device advances toward the sweeping up direction. Further, regarding the state of the designating device, including the two-dimensional coordinates, the direction and the length of a change regarding the dislocation of the two-dimensional coordinates are converted into coordinates vector values, and when non-insertion of the designating device is detected, the degree of the change of the coordinates vector value is recognized. If there is no great change in the coordinates vector value, it is assumed that trailing has occurred following the sweeping up portion 206, and a redundant part due to the trailing can be prevented from being drawn in the sweeping up portion 206 by performing processing of shortening the drawing line by a predetermined length. Similarly, attention is paid to the fact that it is more practically usual in the ending portion 205 in Kanji characters that, when the designating device such as a finger is separated from the touch panel 122, the designating device steeply and shortly moves in a direction which greatly differs from the preceding drawing direction. Further, regarding the state of the designating device, including the two-dimensional coordinates, the direction and the length of the change regarding the dislocation of the two-dimensional coordinates are converted into coordinates vector values, and when non-insertion of the designating device is detected, the degree of the change of the coordinates vector value is recognized. If there is a great change in the coordinates vector value, it is recognized that trailing has occurred in the ending portion 205, and the trailing drawing line 204 will not be added to the ending portion 205 by performing processing for disabling drawing the trailing portion. Accordingly, such processing to erase a trailed part of a drawn character in an erasing mode is not needed.

The operation of the coordinate inputting/detecting apparatus 151 having the above-described characteristic configuration of the fourth example can also be executed by allowing a computer to read a program previously stored in an information storage medium such as an FD or CD-ROM. For example, a program for allowing the computer to execute the following functions may be stored in an information storage medium such as the CD-ROM 39. A coordinate detection function detects the two-dimensional coordinates of a designating device on the touch panel 122 at predetermined time intervals. An insertion/non-insertion detection function detects the inserted/non-inserted state of the designating device relative to the touch panel 122. A vectorization function converts into coordinates vector values the direction of a change between the two-dimensional coordinates which are sequentially detected at predetermined time intervals by the coordinate detection function. And, a sweeping up processing function shortens a drawing line connecting the two-dimensional coordinates intermediately before non-insertion of the designating device is detected and the preceding two-dimensional coordinates by a predetermined length if there is no great change exceeding a predetermined value in the coordinates vector values obtained using the vectorization function when the non-insertion of the designating device is detected using the insertion/non-insertion detection function.

Alternatively, a program for allowing the computer to execute the following functions may be stored in an information storage medium such as the CD-ROM 39. A coordinate detection function detects the two-dimensional coordinates of the designating device on the touch panel 122 at predetermined time intervals. An insertion/non-insertion detection function detects the inserted/non-inserted state of the designating device relative to the touch panel 122. A vectorization function converts into coordinates vector values the direction and length of a change between the two-dimensional coordinates which are sequentially detected at predetermined time intervals using the coordinate detection function. And, an end trailing processing function disables drawing of the line connecting between the two-dimensional coordinates where the non-insertion of the designating device is detected and the preceding two-dimensional coordinates if there is a great change exceeding a predetermined value in the coordinates vector values obtained using the vectorization function when the non-insertion of the designating device is detected using the insertion/non-insertion detection function.

Figure 32:
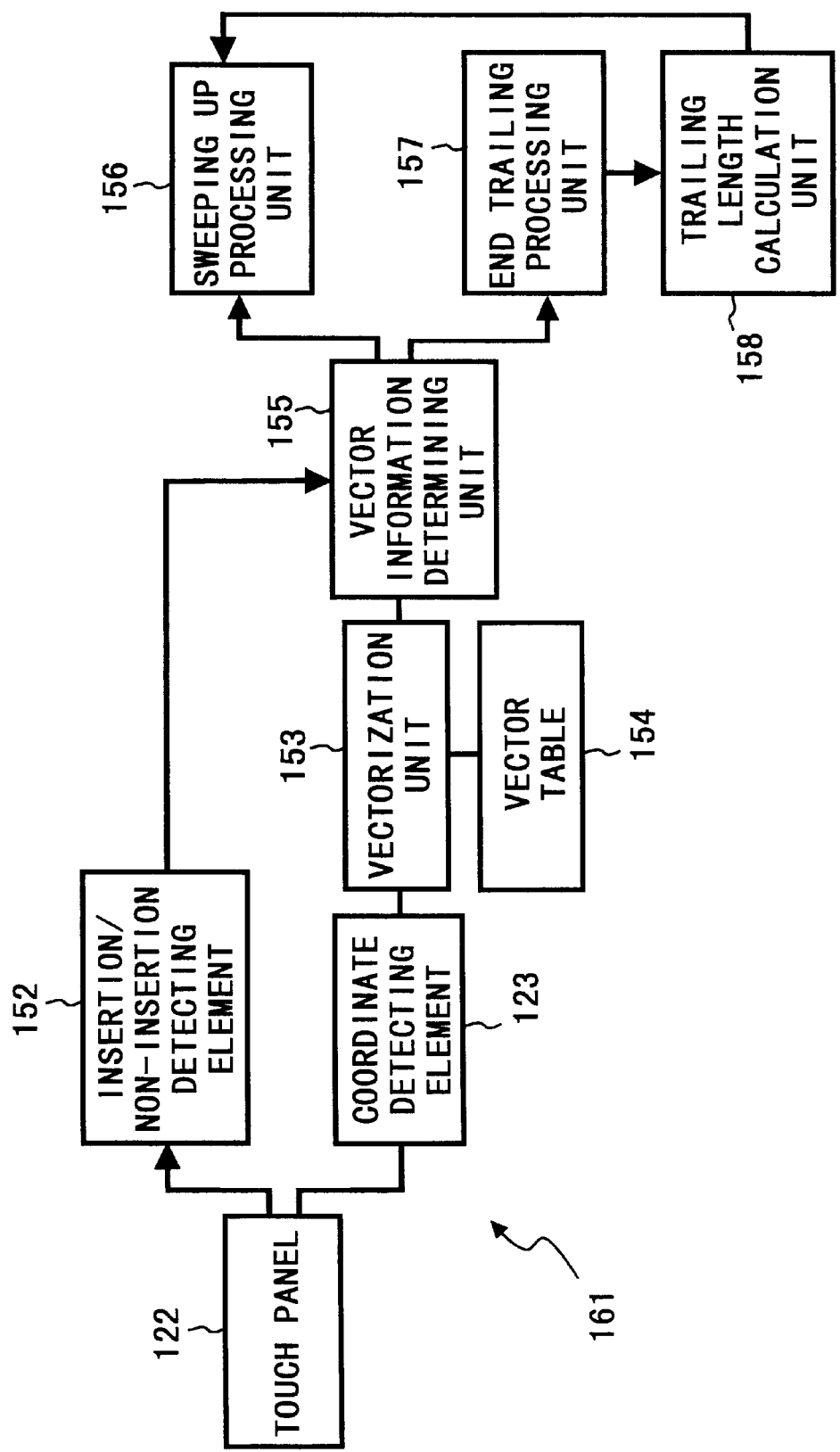
FIG. 32 is a block diagram illustrating a coordinate inputting/detecting apparatus having a characteristic configuration of a fifth example according to the present invention.
Figure 33:
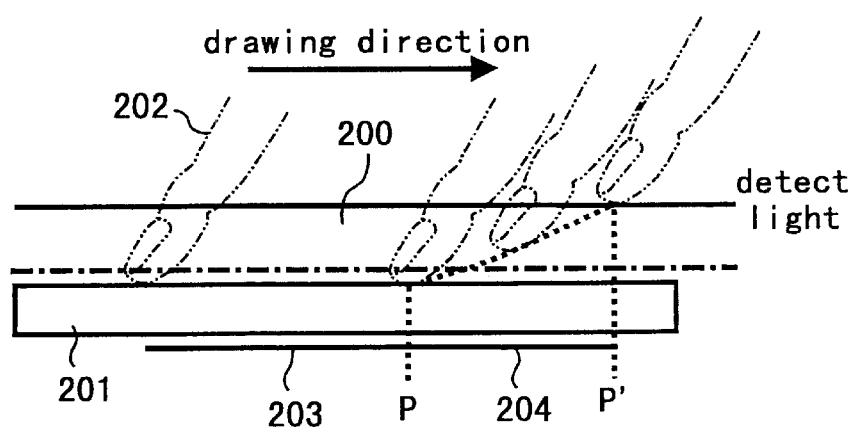
FIG. 33 is an explanatory drawing for explaining an operation of drawing with a finger.

A fifth characteristic example of the configuration of a coordinate inputting/detecting apparatus according to the present invention is described with reference to FIG. 32. FIG. 32 is a block diagram of a coordinate inputting/detecting device 161 having the characteristic configuration of the fifth example.

In a fifth characteristic configuration example, the sweeping up processing unit 156 is configured such that when the processing of the sweeping up processing unit 156 is executed, the trailing length information obtained from the processing of the end trailing processing unit 157 is reflected on a length by which a trailing portion of the sweeping portion 207 and the sweeping up portion 206 is shortened. Therefore, a trailing length calculation unit 158 is provided to the end trailing processing unit 157 and the output is given to the sweeping up processing unit 156. The trailing length calculation unit 158 calculates an average of drawing line lengths of the trailing drawing lines 204 between the detachment detected coordinates and the preceding coordinates which are disabled in the end trailing processing unit 157, and outputs the information of the average length to the sweeping up processing unit 156.

That is, in the aforementioned fourth characteristic configuration example, as the trailing length following the sweeping portion 207 or the sweeping up portion 206, an experimentally obtained fixed value is used, and the trailing portion following the sweeping portion 207 or the sweeping up portion 206 is shortened by that fixed value. Therefore, an individual difference among the users operating the apparatus is not considered in particular. In the fifth characteristic configuration example, the trailing length following the sweeping portion 207 or the sweeping up portion 206 is estimated by learning using the trailing length information, including the individual difference among the users operating the apparatus, obtained through the drawing of the ending portion 205 in actual use, without performing an experiment in particular, and thereby more appropriate shortening processing of the trailing in which the individual difference of the users is reflected is enabled.

Specifically, according to the fifth characteristic configuration example, by calculating the average of the length of drawing lines which are disabled in the end trailing processing unit 157, by the trailing length calculation unit 158, and by reflecting the information of the average length on the trailing length in the sweeping up processing unit 156, the trailing length following the sweeping portion 207 or the sweeping up portion 206 may be estimated by learning while absorbing the individual difference on a practical level without performing an experiment, and thereby appropriate sweeping up processing which matches each user is enabled.

The operation of the coordinate inputting/detecting apparatus 161 having the above-described characteristic configuration of the fifth example can also be executed by allowing a computer to read a program previously stored in an information storage medium such as an FD or CD-ROM. The program allows the computer, for example, to perform the following functions. A coordinate detection function detects the two-dimensional coordinates of a designating device on the touch panel 122 at predetermined time intervals. An insertion/non-insertion detection function detects the inserted/non-inserted state of the designating device relative to the touch panel 122. A vectorization function converts into coordinates vector values the direction of a change between the two-dimensional coordinates which are sequentially detected at predetermined time intervals by the coordinate detection function. An end trailing processing function disables a drawing line connecting between the two-dimensional coordinates where the non-insertion of the designating device is detected and the preceding coordinates if there is a great change exceeding a predetermined value in the coordinates vector value obtained using the vectorization function when the non-insertion of the designating device is detected using the insertion/non-insertion detection function. A trailing length calculation function calculates the average of the lengths of the drawing lines which are disabled in the end trailing processing function. And, a sweeping up processing function shortens a drawing line connecting the two-dimensional coordinates intermediately before the non-insertion of the designating device is detected and the preceding two-dimensional coordinates by the average length calculated by the trailing length calculation function if there is no great change exceeding a predetermined value in the coordinates vector value obtained using the vectorization function when the non-insertion of the designating device is detected using the insertion/non-insertion detection function.

The mechanism and processes set forth in the present description may be implemented using a conventional general purpose microprocessor programmed according to the teachings in the present specification, as will be appreciated to those skilled in the relevant art. Appropriate software coding can be readily prepared by skilled programmers based upon the teachings of the present disclosure, as will also be apparent to those skilled in the art.

The present invention thus also includes a computer program product which may be hosted on a storage medium and include instructions which can be used to program a microprocessor to perform a process in accordance with the present invention. The storage medium can include, but is not limited to, any type of disk including floppy disks, optical disks, CD-ROMs, magneto-optical disks, ROMs, RAMs, EPROMS, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A coordinate inputting/detecting apparatus for optically detecting a position of a designating device inserted into an at least substantially flat two-dimensional coordinate inputting/detecting area of the apparatus, comprising:

a coordinate determining device configured to determine two-dimensional coordinates of the designating device in the coordinate inputting/detecting area;

a distance determining device configured to determine a distance of the designating device from a surface of the coordinate inputting/detecting area when the designating device is located in vicinity to the coordinate inputting/detecting area;

a storing device configured to store information of the two-dimensional coordinates determined by the coordinates determining device and information of the distance determined by the distance determining device so as to be associated with each other;

a coordinates change detecting/storing device configured to detect a change of the two-dimensional coordinates information stored in the storing device at a predetermined time interval and to store the detected change of the two-dimensional coordinates information;

a distance change detecting/storing device configured to detect a change of the distance information stored in the storing device at a predetermined time interval and to store the detected change of the distance information; and a state allocating device configured to allocate at least one designating state among designating states of the designating device stored in advance, based upon the coordinate change information detected and stored by the coordinate change detecting/storing device and the distance change information detected and stored by the distance change detecting/storing device.

2. A coordinate inputting/detecting apparatus of claim 1, the coordinates determining device including:

a plurality of light emitting devices configured to emit optical beams two-dimensionally toward the coordinate inputting/detecting area;

a light returning reflective device configured to reflect the optical beams emitted by the plurality of light emitting devices so as to return in substantially reverse directions to the coordinate inputting/detecting area; and a plurality of light receiving devices respectively disposed in positions to receive the optical beams reflected by the light returning reflective device so as to detect a light intensity distribution of the optical beams;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area by the light returning reflective device, and the distance determining device determines the distance of the designating device from the surface of the coordinate inputting/detecting area based upon light intensity of the optical beams received by the plurality of light receiving devices.

3. A coordinate inputting/detecting apparatus of claim 1, the coordinates determining device including:

an image inputting device configured to optically input image information of the coordinate inputting/detecting area; and a conversion device configured to convert a part of the image information input by the image inputting device to information of two-dimensional coordinates of the designating device;

wherein the distance determining device determines the distance of the designating device from the surface of the coordinate inputting/detecting area based upon image density information of the image information input by the image inputting device.

4. A coordinate inputting/detecting apparatus of claim 1, the coordinates determining device including:

a plurality of light emitting devices configured to emit optical beams toward the coordinate inputting/detecting area;

a plurality of light receiving devices arranged in vicinity of the plurality of light emitting devices so as to correspond to the plurality of light emitting devices, respectively; and a light returning reflective device configured to reflect the optical beams emitted by the plurality of light emitting devices so as to return to substantially same positions as those of the plurality of light emitting devices to be guided to respective corresponding light receiving devices;

wherein, the two-dimensional coordinates of the designating device in the coordinate inputting/detecting area are recognized based upon a light intensity distribution corresponding to an inserted position of the designating device in the coordinate inputting/detecting area, and the distance determining device determines the distance of the designating device from the surface of the coordinate inputting/detecting area based upon light intensity of the optical beams received by the plurality of light receiving devices.

5. A coordinate inputting/detecting apparatus of claim 1, the coordinates determining device including:

a plurality of light emitting devices configured to emit optical beams two-dimensionally toward the coordinate inputting/detecting area; and a plurality of light receiving devices arranged in positions facing the plurality of light emitting devices, respectively;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area, and the distance determining device determines the distance of the designating device from the surface of the coordinate inputting/detecting area based upon light intensity of the optical beams received by the plurality of light receiving devices.

6. A coordinate inputting/detecting apparatus for optically detecting a position of a designating device inserted into an at least substantially flat two-dimensional coordinate inputting/detecting area of the apparatus, comprising:

a coordinate determining device configured to determine two-dimensional coordinates of the designating device in the coordinate inputting/detecting area;

a distance determining device configured to determine a distance of the designating device from a surface of the coordinate inputting/detecting area when the designating device is located in vicinity to the coordinate inputting/detecting area;

a storing device configured to store information of the two-dimensional coordinates determined by the coordinates determining device and information of the distance determined by the distance determining device so as to be associated with each other;

a coordinates change detecting/storing device configured to detect a change of the two-dimensional coordinates information stored in the storing device at a predetermined time interval and to store the detected change of the two-dimensional coordinates information;

a distance change detecting/storing device configured to detect a change of the distance information stored in the storing device at a predetermined time interval and to store the detected change of the distance information;

a ratio calculating device configured to calculate a ratio between the coordinates change detected by the coordinates change detecting/storing device and the distance change detected by the distance change detecting/storing device;

a threshold value storing device configured to store at least one predetermined threshold value for the ratio;

a comparing device configured to compare the ratio calculated by the ratio calculating device and the threshold value stored by the threshold storing device; and a state allocating device configured to allocate at least one designating state among designating states of the designating device stored in advance, based upon a result of the comparison by the comparing device.

7. A coordinate inputting/detecting apparatus of claim 6, the state allocating device including a determining device configured to determine, according to a result of the comparison by the comparing device, that the designating device has not been inserted into the coordinate inputting/detecting area when the ratio is greater than the threshold value, and that the designating device has been inserted into the coordinate inputting/detecting area when the ratio is equal to or smaller than the threshold value.

8. A coordinate inputting/detecting apparatus of claim 6, the coordinates determining device including:

a plurality of light emitting devices configured to emit optical beams two-dimensionally toward the coordinate inputting/detecting area;

a light returning reflective device configured to reflect the optical beams emitted by the plurality of light emitting devices so as to return in substantially reverse directions to the coordinate inputting/detecting area; and a plurality of light receiving devices respectively disposed in positions to receive the optical beams reflected by the light returning reflective device so as to detect a light intensity distribution of the optical beams;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area by the light returning reflective device, and the distance determining device determines the distance of the designating device from the surface of the coordinate inputting/detecting area based upon light intensity of the optical beams received by the plurality of light receiving devices.

9. A coordinate inputting/detecting apparatus of claim 6, the coordinates determining device including:

an image inputting device configured to optically input image information of the coordinate inputting/detecting area; and a conversion device configured to convert a part of the image information input by the image inputting device to information of two-dimensional coordinates of the designating device;

wherein the distance determining device determines the distance of the designating device from the surface of the coordinate inputting/detecting area based upon image density information of the image information input by the image inputting device.

10. A coordinate inputting/detecting apparatus of claim 6, the coordinates determining device including:

a plurality of light emitting devices configured to emit optical beams toward the coordinate inputting/detecting area;

a plurality of light receiving devices arranged in vicinity of the plurality of light emitting devices so as to correspond to the plurality of light emitting devices, respectively; and a light returning reflective device configured to reflect the optical beams emitted by the plurality of light emitting devices so as to return to substantially same positions as those of the plurality of light emitting devices to be guided to respective corresponding light receiving devices;

wherein, the two-dimensional coordinates of the designating device in the coordinate inputting/detecting area are recognized based upon a light intensity distribution corresponding to an inserted position of the designating device in the coordinate inputting/detecting area, and the distance determining device determines the distance of the designating device from the surface of the coordinate inputting/detecting area based upon light intensity of the optical beams received by the plurality of light receiving devices.

11. A coordinate inputting/detecting apparatus of claim 6, the coordinates determining device including:

a plurality of light emitting devices configured to emit optical beams two-dimensionally toward the coordinate inputting/detecting area; and a plurality of light receiving devices arranged in positions facing the plurality of light emitting devices, respectively;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area, and the distance determining device determines the distance of the designating device from the surface of the coordinate inputting/detecting area based upon light intensity of the optical beams received by the plurality of light receiving devices.

12. A coordinate inputting/detecting apparatus for optically detecting a position of a designating device inserted into on at least substantially flat two-dimensional coordinate inputting/detecting area of the apparatus, comprising:

a coordinate determining device configured to determine two-dimensional coordinates of the designating device in the coordinate inputting/detecting area; a distance determining device configured to determine a distance of the designating device from a surface of the coordinate inputting/detecting area when the designating device is located in vicinity to the coordinate inputting/detecting area;

a storing device configured to store information of the two-dimensional coordinates determined by the coordinates determining device and information of the distance determined by the distance determining device so as to be associated with each other;

a coordinates change detecting/storing device configured to detect a change of the two-dimensional coordinates information stored in the storing device at a predetermined time interval and to store the detected change of the two-dimensional coordinates information;

a distance change detecting/storing device configured to detect a change of the distance information stored in the storing device at a predetermined time interval and to store the detected change of the distance information;

a gradient calculating device configured to calculate a gradient of the distance change detected by the distance change detecting/storing device relative to the coordinates change detected by the coordinates change detecting/storing device;

a threshold value storing device configured to store at least one predetermined threshold value for the gradient;

a comparing device configured to compare the gradient calculated by the gradient calculating device and the threshold value stored by the threshold storing device; and a state allocating device configured to allocate at least one designating state among designating states of the designating device stored in advance, based upon a result of the comparison by the comparing device.

13. A coordinate inputting/detecting apparatus of claim 12, the state allocating device including a determining device configured to determine, according to a result of the comparison by the comparing device, that the designating device has not been inserted into the coordinate inputting/detecting area when the gradient is greater than the threshold value, and that the designating device has been inserted into the coordinate inputting/detecting area when the gradient is equal to or smaller than the threshold value.

14. The coordinate inputting/detecting apparatus of claim 12, the coordinates determining device including:

a plurality of light emitting devices configured to emit optical beams two-dimensionally toward the coordinate inputting/detecting area;

a light returning reflective device configured to reflect the optical beams emitted by the plurality of light emitting devices so as to return in substantially reverse directions to the coordinate inputting/detecting area; and a plurality of light receiving devices respectively disposed in positions to receive the optical beams reflected by the light returning reflective device so as to detect a light intensity distribution of the optical beams;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area by the light returning reflective device, and the distance determining device determines the distance of the designating device from the surface of the coordinate inputting/detecting area based upon light intensity of the optical beams received by the plurality of light receiving devices.

15. A coordinate inputting/detecting apparatus of claim 12, the coordinates determining device including:

an image inputting device configured to optically input image information of the coordinate inputting/detecting area; and a conversion device configured to convert a part of the image information input by the image inputting device to information of two-dimensional coordinates of the designating device;

wherein the distance determining device determines the distance of the designating device from the surface of the coordinate inputting/detecting area based upon image density information of the image information input by the image inputting device.

16. A coordinate inputting/detecting apparatus of claim 12, the coordinates determining device including:

a plurality of light emitting devices configured to emit optical beams toward the coordinate inputting/detecting area;

a plurality of light receiving devices arranged in vicinity of the plurality of light emitting devices so as to correspond to the plurality of light emitting devices, respectively; and a light returning reflective device configured to reflect the optical beams emitted by the plurality of light emitting devices so as to return to substantially same positions as those of the plurality of light emitting devices to be guided to respective corresponding light receiving devices;

wherein, the two-dimensional coordinates of the designating device in the coordinate inputting/detecting area are recognized based upon a light intensity distribution corresponding to an inserted position of the designating device in the coordinate inputting/detecting area, and the distance determining device determines the distance of the designating device from the surface of the coordinate inputting/detecting area based upon light intensity of the optical beams received by the plurality of light receiving devices.

17. A coordinate inputting/detecting apparatus of claim 12, the coordinates determining device including:

a plurality of light emitting devices configured to emit optical beams two-dimensionally toward the coordinate inputting/detecting area; and a plurality of light receiving devices arranged in positions facing the plurality of light emitting devices, respectively;

wherein, the designating device has a light interrupting property, and the two-dimensional coordinates of the designating device in the coordinate inputting/detecting area are recognized based upon existence of the designating device in emitted/received light optical paths formed in the coordinate inputting/detecting area, and the distance determining device determines the distance of the designating device from the surface of the coordinate inputting/detecting area based upon light intensity of the optical beams received by the plurality of light receiving devices.

18. A coordinate inputting/detecting apparatus for optically detecting a position of a designating device inserted into an at least substantially flat two-dimensional coordinate inputting/detecting area of the apparatus, comprising:

coordinates determining means for determining two-dimensional coordinates of the designating device in the coordinate inputting/detecting area;

distance determining means for determining a distance of the designating device from a surface of the coordinate inputting/detecting area;

storing means for storing information of the two-dimensional coordinates determined by the coordinates determining means and information of the distance determined by the distance determining means so as to be associated with each other;

coordinates change detecting/storing means for detecting a change of the two-dimensional coordinates information stored in the storing means and for storing the detected change of the two-dimensional coordinates information;

distance change detecting/storing means for detecting a change of the distance information stored in the storing means at a predetermined time interval and for storing the detected change of the distance information; and state allocating means for allocating at least one designating state among designating states of the designating device stored in advance.

19. A coordinate inputting/detecting apparatus for optically detecting a position of a designating device inserted into an at least substantially flat two-dimensional coordinate inputting/detecting area of the apparatus, comprising:

coordinates determining means for determining two-dimensional coordinates of the designating device in the coordinate inputting/detecting area;

distance determining means for determining a distance of the designating device from a surface of the coordinate inputting/detecting area;

storing means for storing information of the two-dimensional coordinates determined by the coordinates determining means and information of the distance determined by the distance determining means so as to be associated with each other;

coordinates change detecting/storing means for detecting a change of the two-dimensional coordinates information stored in the storing means at a predetermined time interval and for storing the detected change of the two-dimensional coordinates information;

distance change detecting/storing means for detecting a change of the distance information stored in the storing means and for storing the detected change of the distance information;

ratio calculating means for calculating a ratio between the coordinates change detected by the coordinates change detecting/storing means and the distance change detected by the distance change detecting/storing means;

threshold value storing means for storing at least one predetermined threshold value for the ratio;

comparing means for comparing the ratio calculated by the ratio calculating means and the threshold value stored by the threshold storing means; and state allocating means for allocating at least one designating state among designating states of the designating device stored in advance.

20. A coordinate inputting/detecting apparatus for optically detecting a position of a designating device inserted into an at least substantially flat two-dimensional coordinate inputting/detecting area of the apparatus, comprising:

coordinates determining means for determining two-dimensional coordinates of the designating device in the coordinate inputting/detecting area;

distance determining means for determining a distance of the designating device from a surface of the coordinate inputting/detecting area;

storing means for storing information of the two-dimensional coordinates determined by the coordinates determining means and information of the distance determined by the distance determining means so as to be associated with each other;

coordinates change detecting/storing means for detecting a change of the two-dimensional coordinates information stored in the storing means and for storing the detected change of the two-dimensional coordinates information;

distance change detecting/storing means for detecting a change of the distance information stored in the storing means and for storing the detected change of the distance information;

gradient calculating means for calculating a gradient of the distance change detected by the distance change detecting/storing means relative to the coordinates change detected by the coordinates change detecting/storing means;

threshold value storing means for storing at least one predetermined threshold value for the gradient;

comparing means for comparing the gradient calculated by the gradient calculating means and the threshold value stored by the threshold storing means; and state allocating means for allocating at least one designating state among designating states of the designating device stored in advance.

21. A method of optically detecting a position of a designating device inserted into an at least substantially flat two-dimensional coordinate inputting/detecting area of a coordinate inputting/detecting apparatus and inputting/detecting two-dimensional coordinates of the designating device in the coordinate inputting/detecting area of the apparatus, the method comprising steps of:

determining the two-dimensional coordinates of the designating device in the coordinate inputting/detecting area;

determining a distance of the designating device from a surface of the coordinate inputting/detecting area when the designating device is located on or in vicinity to the coordinate inputting/detecting area;

storing information of the two-dimensional coordinates determined in the coordinates determining step and information of the distance determined in the distance determining step so as to be associated with each other;

detecting a change of the two-dimensional coordinates information stored in the storing step at a predetermined time interval and storing the detected change of the two-dimensional coordinates information;

detecting a change of the distance information stored in the storing step at a predetermined time interval and storing the detected change of the distance information; and allocating at least one designating state among designating states of the designating device stored in advance, based upon the coordinates change information detected and stored in the coordinates change detecting/storing step and the distance change information detected and stored in the distance change detecting/storing step.

22. A computer program product directly loadable into an internal memory of a computer, comprising software code mechanism for performing the steps of claim 21, when the computer program product is run on the computer.

23. A method of optically detecting a position of a designating device inserted into an at least substantially flat two-dimensional coordinate inputting/detecting area of a coordinate inputting/detecting apparatus and inputting/detecting two-dimensional coordinates of the designating device in the coordinate inputting/detecting area of the apparatus, the method comprising steps of:

determining the two-dimensional coordinates of the designating device in the coordinate inputting/detecting area;

determining a distance of the designating device from a surface of the coordinate inputting/detecting area when the designating device is located on or in vicinity to the coordinate inputting/detecting area;

storing information of the two-dimensional coordinates determined in the coordinates determining step and information of the distance determined in the distance determining step so as to be associated with each other;

detecting a change of the two-dimensional coordinates information stored in the storing step at a predetermined time interval and storing the detected change of the two-dimensional coordinates information;

detecting a change of the distance information stored in the storing step at a predetermined time interval and storing the detected change of the distance information;

calculating a ratio between the coordinates change detected in the coordinates change detecting/storing step and the distance change detected in the distance change detecting/storing step;

storing at least one predetermined threshold value for the ratio;

comparing the ratio calculated in the calculating step and the threshold value stored in the threshold storing step; and allocating at least one designating state among designating states of the designating device stored in advance, based upon a result of the comparison in the comparing step.

24. A method of claim 23, the state allocating step including a step of determining, according to a result of the comparison step, that the designating device has not been inserted into the coordinate inputting/detecting area when the gradient is greater than the threshold value, and that the designating device has been inserted into the coordinate inputting/detecting area when the gradient is equal to or smaller than the threshold value.

25. A computer program product directly loadable into an internal memory of a computer, comprising software code mechanism for performing the steps of claim 24, when the computer program product is run on the computer.

26. A computer program product directly loadable into an internal memory of a computer, comprising software code mechanism for performing the steps of claim 23, when the computer program product is run on the computer.

27. A method of optically detecting a position of a designating device inserted into an at least substantially flat two-dimensional coordinate inputting/detecting area of a coordinate inputting/detecting apparatus and inputting/detecting two-dimensional coordinates of the designating device in the coordinate inputting/detecting area of the apparatus, the method comprising steps of:

determining the two-dimensional coordinates of the designating device in the coordinate inputting/detecting area;

determining a distance of the designating device from a surface of the coordinate inputting/detecting area when the designating device is located on or in vicinity to the coordinate inputting/detecting area;

storing information of the two-dimensional coordinates determined in the coordinates determining step and information of the distance determined in the distance determining step so as to be associated with each other;

detecting a change of the two-dimensional coordinates information stored in the storing step at a predetermined time interval and storing the detected change of the two-dimensional coordinates information;

detecting a change of the distance information stored in the storing step at a predetermined time interval and storing the detected change of the distance information;

calculating a gradient of the distance change detected in the distance change detecting/storing step relative to the coordinates change detected in the coordinates change detecting/storing step;

storing at least one predetermined threshold value for the gradient;

comparing the gradient calculated in the calculating step and the threshold value stored in the threshold storing step; and allocating at least one designating state among designating states of the designating device stored in advance, based upon a result of the comparison in the comparing step.

28. A method of claim 27, the state allocating step including a step of determining, according to a result of the comparison step, that the designating device has not been inserted into the coordinate inputting/detecting area when the gradient is greater than the threshold value, and that the designating device has been inserted into the coordinate inputting/detecting area when the gradient is equal to or smaller than the threshold value.

29. A computer program product directly loadable into an internal memory of a computer, comprising software code mechanism for performing the steps of claim 28, when the computer program product is run on the computer.

30. A computer program product directly loadable into an internal memory of a computer, comprising software code mechanism for performing the steps of claim 27, when the computer program product is run on the computer.

31. A computer program product, comprising:

a computer storage medium and a computer program code mechanism embedded in the computer storage medium for causing a computer to control optical detection of a position of a designating device inserted into an at least substantially flat two-dimensional coordinate inputting/detecting area of a coordinate inputting/detecting apparatus and inputting/detecting of two-dimensional coordinates of the designating device in the coordinate inputting/detecting area of the apparatus, the computer program code mechanism including:

a first computer code device configured to determine the two-dimensional coordinates of the designating device in the coordinate inputting/detecting area;

a second computer code device configured to determine a distance of the designating device from a surface of the coordinate inputting/detecting area when the designating device is located on or in vicinity to the coordinate inputting/detecting area;

a third computer code device configured to store information of the two-dimensional coordinates determined by the first computer code device and information of the distance determined by the second computer code device so as to be associated with each other;

a fourth computer code device configured to detect a change of the two-dimensional coordinates information stored by the third computer code device at a predetermined time interval and to store the detected change of the two-dimensional coordinates information;

a fifth computer code device configured to detect a change of the distance information stored by the third computer code device at a predetermined time interval and to store the detected change of the distance information; and a sixth computer code device configured to allocate at least one designating state among designating states of the designating device stored in advance, based upon the coordinate change information detected and stored by the fourth computer code device and the distance change information detected and stored by the fifth computer code device.

32. A computer program product, comprising:

a computer storage medium and a computer program code mechanism embedded in the computer storage medium for causing a computer to control optical detection of a position of a designating device inserted into an at least substantially flat two-dimensional coordinates inputting/detecting area of a coordinate inputting/detecting apparatus and inputting/detecting of two-dimensional coordinates of the designating device in the coordinate inputting/detecting area of the apparatus, the computer program code mechanism including:

a first computer code device configured to determine the two-dimensional coordinates of the designating device in the coordinate inputting/detecting area;

a second computer code device configured to determine a distance of the designating device from a surface of the coordinate inputting/detecting area when the designating device is located on or in vicinity to the coordinate inputting/detecting area;

a third computer code device configured to store information of the two-dimensional coordinates determined by the first computer coded device and information of the distance determined by the second computer code device so as to be associated with each other;

a fourth computer code device configured to detect a change of the two-dimensional coordinates information stored by the third computer code device at a predetermined time interval and to store the detected change of the two-dimensional coordinates information;

a fifth computer code device configured to detect a change of the distance information stored by the third computer code device at a predetermined time interval and to store the detected change of the distance information;

a sixth computer code device configured to calculate a ratio between the coordinates change detected by the fourth computer code device and the distance change detected by the fifth computer code device;

a seventh computer code device configured to store at least one predetermined threshold value for the ratio;

an eighth computer code device configured to compare the ratio calculated by the sixth computer code device and the threshold value stored by the seventh computer code device; and a ninth computer code device configured to allocate at least one designating state among designating states of the designating device stored in advance, based upon a result of the comparison by the eighth computer code device.

33. A computer program product of claim 32, the ninth computer code device including a tenth computer code device configured to determine, according to a result of the comparison by the eighth computer code device, that the designating device has not been inserted into the coordinate inputting/detecting area when the ratio is greater than the threshold value, and that the designating device has been inserted into the coordinate inputting/detecting area when the ratio is equal to or smaller than the threshold value.

34. A computer program product, comprising:

a computer storage medium and a computer program code mechanism embedded in the computer storage medium for causing a computer to control optical detection of a position of a designating device inserted into an at least substantially flat two-dimensional coordinates inputting/detecting area of a coordinate inputting/detecting apparatus and inputting/detecting of two-dimensional coordinates of the designating device in the coordinate inputting/detecting area of the apparatus, the computer program code mechanism including:

a first computer code device configured to determine the two-dimensional coordinates of the designating device in the coordinate inputting/detecting area;

a second computer code device configured to determine a distance of the designating device from a surface of the coordinate inputting/detecting area when the designating device is located in vicinity to the coordinate inputting/detecting area;

a third computer code device configured to store information of the two-dimensional coordinates determined by the first computer code device and information of the distance determined by the second computer code device so as to be associated with each other;

a fourth computer code device configured to detect a change of the two-dimensional coordinates information stored by the third computer code device at a predetermined time interval and to store the detected change of the two-dimensional coordinates information;

a fifth computer code device configured to detect a change of the distance information stored by the third computer code device at a predetermined time interval and to store the detected change of the distance information;

a sixth computer code device configured to calculate a gradient of the distance change detected by the fifth computer code device relative to the coordinates change detected by the fourth computer code device;

a seventh computer code device configured to store at least one predetermined threshold value for the gradient;

an eighth computer code device configured to compare the gradient calculated by the sixth computer code device and the threshold value stored by the seventh computer code device; and a ninth computer code device configured to allocate at least one designating state among designating states of the designating device stored in advance, based upon a result of the comparison by the eighth computer code device.

35. A computer program product of claim 34, the ninth computer code device including a tenth computer code device configured to determine, according to a result of the comparison by the eighth computer code device, that the designating device has not been inserted into the coordinate inputting/detecting area when the ratio is greater than the threshold value, and that the designating device has been inserted into the coordinate inputting/detecting area when the ratio is equal to or smaller than the threshold value.

* * * * *